(12) United States Patent
Shusman

(10) Patent No.: US 10,735,797 B2
(45) Date of Patent: Aug. 4, 2020

(54) PROVIDING INTERACTIVE VIDEO ON DEMAND

(71) Applicant: MediaIP, Inc., Jenkintown, PA (US)

(72) Inventor: Chad W. Shusman, Jenkintown, PA (US)

(73) Assignee: MediaIP, Inc., Jenkintown, PA (US)

( * ) Notice: Subject to any disclaimer, the term of this patent is extended or adjusted under 35 U.S.C. 154(b) by 0 days.

(21) Appl. No.: 16/252,179

(22) Filed: Jan. 18, 2019

(65) Prior Publication Data

US 2019/0230397 A1 Jul. 25, 2019

Related U.S. Application Data

(63) Continuation of application No. 15/790,802, filed on Oct. 23, 2017, now Pat. No. 10,187,683, which is a (Continued)

(51) Int. Cl.
| | |
|---|---|
| H04N 21/2668 | (2011.01) |
| H04N 21/23 | (2011.01) |
| H04N 21/234 | (2011.01) |
| H04N 21/854 | (2011.01) |
| H04N 21/2343 | (2011.01) |
| H04N 21/8541 | (2011.01) |

(Continued)

(52) U.S. Cl.
CPC ........ *H04N 21/2668* (2013.01); *H04H 20/38* (2013.01); *H04H 60/33* (2013.01); *H04N 7/088* (2013.01); *H04N 7/17336* (2013.01); *H04N 21/23* (2013.01); *H04N 21/234* (2013.01); *H04N 21/23424* (2013.01); *H04N 21/23439* (2013.01); *H04N 21/23605* (2013.01); *H04N 21/23614* (2013.01); *H04N 21/25891* (2013.01); *H04N 21/40* (2013.01); *H04N 21/43* (2013.01); *H04N 21/431* (2013.01); *H04N 21/4307* (2013.01); *H04N 21/44222* (2013.01); *H04N 21/47* (2013.01); *H04N 21/472* (2013.01); *H04N 21/4758* (2013.01); *H04N 21/47202* (2013.01); *H04N 21/812* (2013.01); *H04N 21/85* (2013.01); *H04N 21/854* (2013.01); *H04N 21/8541* (2013.01); *H04N 21/8545* (2013.01); *H04H 2201/30* (2013.01)

(58) Field of Classification Search
None
See application file for complete search history.

(56) References Cited

U.S. PATENT DOCUMENTS

| | | |
|---|---|---|
| 5,818,510 A | 10/1998 | Cobbley et al. |
| 5,964,162 A | 10/1999 | Chuan-Jen |

(Continued)

OTHER PUBLICATIONS

International Search Report for International Application No. PCT/US03111534 which was filed on Apr. 15, 2003.

*Primary Examiner* — Justin E Shepard
(74) *Attorney, Agent, or Firm* — Volpe and Koenig, P.C.

(57) ABSTRACT

Multimedia content to participant client devices may be simultaneously presented using a moderator device. An interactive program with the multimedia content and an interactive component associated with the multimedia content may be generated. Participant client devices and the user of the moderator client device may interact with the interactive program to cause the multimedia content and the interactive component to be simultaneously displayed on the display of each of the participant client devices and the display of the moderator client device.

14 Claims, 21 Drawing Sheets

Related U.S. Application Data continuation of application No. 14/611,152, filed on Jan. 30, 2015, now Pat. No. 9,800,916, which is a continuation of application No. 11/323,575, filed on Dec. 29, 2005, now Pat. No. 8,949,875, which is a continuation of application No. 10/414,863, filed on Apr. 15, 2003, now abandoned.

(51) Int. Cl.

| | | |
|---|---|---|
| *H04N 21/47* | (2011.01) | |
| *H04N 21/43* | (2011.01) | |
| *H04N 21/472* | (2011.01) | |
| *H04N 21/85* | (2011.01) | |
| *H04N 21/40* | (2011.01) | |
| *H04N 21/431* | (2011.01) | |
| *H04H 60/33* | (2008.01) | |
| *H04N 7/088* | (2006.01) | |
| *H04N 7/173* | (2011.01) | |
| *H04N 21/475* | (2011.01) | |
| *H04H 20/38* | (2008.01) | |
| *H04N 21/236* | (2011.01) | |
| *H04N 21/258* | (2011.01) | |
| *H04N 21/442* | (2011.01) | |
| *H04N 21/81* | (2011.01) | |
| *H04N 21/8545* | (2011.01) | |

(56) References Cited

U.S. PATENT DOCUMENTS

| | | |
|---|---|---|
| 6,185,553 B1 | 2/2001 | Byrd et al. |
| 6,211,869 B1 | 4/2001 | Loveman et al. |
| 6,240,555 B1 | 5/2001 | Shoff et al. |
| 6,392,664 B1 | 5/2002 | White et al. |
| 6,968,567 B1 | 11/2005 | Gordon et al. |
| 7,039,940 B2 | 5/2006 | Weatherford |
| 7,254,605 B1 | 8/2007 | Strum |
| 2001/0023436 A1 | 9/2001 | Srinivasan et al. |
| 2001/0037376 A1 | 11/2001 | Ullman et al. |
| 2001/0047516 A1 | 11/2001 | Swain et al. |
| 2002/0007493 A1 | 1/2002 | Butler et al. |
| 2002/0013947 A1 | 1/2002 | Russell et al. |
| 2002/0083473 A1 | 6/2002 | Agnihotri et al. |
| 2002/0088004 A1 | 7/2002 | Kitsukawa et al. |
| 2002/0088011 A1 | 7/2002 | Lamkin |
| 2002/0133405 A1 | 9/2002 | Newnam et al. |
| 2002/0138849 A1 | 9/2002 | Blackketter et al. |
| 2002/0199209 A1 | 12/2002 | Shiga |
| 2003/0025832 A1 | 2/2003 | Swart et al. |
| 2003/0028890 A1 | 2/2003 | Swart et al. |
| 2003/0115612 A1 | 6/2003 | Mao et al. |
| 2003/0196198 A1 | 10/2003 | Broussard et al. |
| 2003/0196206 A1 | 10/2003 | Shusman |
| 2004/0032486 A1 | 2/2004 | Shusman |
| 2004/0078822 A1 | 4/2004 | Breen et al. |
| 2004/0117395 A1 | 6/2004 | Gong |
| 2004/0250272 A1 | 12/2004 | Durden |
| 2005/0047752 A1 | 3/2005 | Wood et al. |
| 2013/0195429 A1 | 8/2013 | Fay et al. |

| Time | Transcript 607 | Datafeed 1 608 Pop-up Facts | Datafeed 2 610 More Info | Datafeed 3 612 Comments & Polls | Datafeed 4 614 Commerce |
|---|---|---|---|---|---|
| 0:00 | John: So what does NATO do? | | | | |
| 0:04 | Joe: Right now, NATO does a tremendous amount- they provide AWL protection to countries like Turkey. They patrol sea lanes. There will be a lot of NATO support activity, even if no direct NATO involvement. | Formed in 1949, NATO was set up largely to discourage an attack by the Soviet Union on the non-communist nations of Western Europe. | North Atlantic Treaty Organization (NATO) is a military alliance consisting of the United States, Canada, and other Western Countries. | | |
| 0:37 | John: The reason I wanted to ask is...how big is it? How many countries are involved, headquartered in Brussels? | | | I can't stand organizations like NATO. I don't like the idea of countries giving up their sovereignty to big, unwieldy "global power"-Yulnarwe3 | "Of Paradise and Power: America Vs. Europe in the New World Order" - $12.60 from Amazon |
| 0:44 | Joe: Headquartered in Brussels, 19 countries with a new relationship with Russia and they've admitted new countries and it's a giant organization, multi-layers of bureaucracy and a political side and a military side that work together. They try very hard to coordinate civilian and military and they coordinate among all the governments and all the decisions taken by consensus. There's no majority voting going on. | After World War II ended in 1945, an intense rivalry developed between Communist countries, led by the Soviet Union, and non-Communist nations, led by the United States. This rivalry became known as the Cold War. | NATO was established not to only discourage Communist aggression but also to keep peace among former enemies in Western Europe. In World War II, for example, Italy and Germany had fought most of the other countries that later became NATO members. | | |
| 1:16 | John: Who runs it now? | NATO's central office had been in Paris. In 1967, the organization moved its headquarters to Brussels, Belgium. | | | |

FIG. 15

PROVIDING INTERACTIVE VIDEO ON DEMAND

CROSS REFERENCE TO RELATED APPLICATION(S)

This application is a continuation of U.S. patent application Ser. No. 15/790,802, filed Oct. 23, 2017, entitled "PROVIDING INTERACTIVE VIDEO ON DEMAND," which is a continuation of U.S. patent application Ser. No. 14/611,152, filed Jan. 30, 2015, entitled "METHOD AND APPLICATION FOR INTERACTIVE VIDEO ON DEMAND,", which issued as U.S. Pat. No. 9,800,916, on Oct. 24, 2017, which is a continuation of U.S. patent application Ser. No. 11/323,575, filed Dec. 29, 2005, entitled "METHOD AND APPLICATION FOR INTERACTIVE VIDEO ON DEMAND," which issued as U.S. Pat. No. 8,949,875 on Feb. 3, 2015, which is a continuation of patent application Ser. No. 10/414,863, filed on Apr. 15, 2003, entitled "METHOD AND APPARATUS FOR INTERACTIVE VIDEO ON DEMAND," now abandoned, which is related to U.S. patent application Ser. No. 10/123,618, filed Apr. 15, 2002, entitled "METHOD AND APPARATUS FOR INTERNET-BASED INTERACTIVE PROGRAMMING," now abandoned, and U.S. patent application Ser. No. 10/222,461, filed on Aug. 16, 2002, entitled "METHOD AND APPARATUS FOR INTERACTIVE PROGRAMMING USING CAPTIONING," now abandoned, the entire contents of all of which are incorporated by reference as if stated fully herein.

BACKGROUND

This invention pertains generally to the field of interactive programming and more specifically to creating interactive video-on-demand programming for distribution over a variety of communication media.

Broadcast media, such as television, have traditionally been limited to serial processes where a program is broadcast to a viewer in an audience with limited opportunities, such as calling in over a telephone line to talk to a talk show host, for the viewer to participate in the program. The evolution to a more interactive form of broadcast media, or media where the viewer is allowed to participate, has been slow given the lack of bidirectional communication channels between the viewer and the program broadcaster.

When bidirectional communication channels are created, viewer participation has so far been limited to choosing program content, responding to advertising messages, and answering viewer questionnaires or polls. This is primarily because most interactive programming follows a conventional broadcast program paradigm wherein the programming is wrapped in advertisements; and the only responses needed from an audience are to view linear pre-recorded programs and to buy advertised items or services. Little has been done to fully involve the audience in a rich participatory experience where the audience has as much control and influence over the content of an interactive program as the originator of the interactive program. Such limited viewer participation is in contrast to the expectations of some viewers who want a richer and more satisfying participatory experience within the context of an interactive program.

Therefore, a need exists for a light-weight interactive programming system allowing for rich viewer participation which is easily integrated with existing content. The present invention meets such need.

SUMMARY OF THE INVENTION

In one aspect of the invention, an interactive programming server embeds interactive components into a video signal. The interactive programming server receives content from a content source and interactive components from an interactive component source and uses the content and interactive components to generate an interactive Video On Demand (iVOD) interactive program. The iVOD interactive program is transmitted through a communications medium to a participant who views the content and interacts with the interactive components of the iVOD interactive program. The participant's responses to the content is transmitted back to the interactive programming server where the participant responses are incorporated into new content which is used to generate new iVOD interactive programming.

In another aspect of the invention, the content is a television signal having a vertical blanking interval and the interactive program is generated by embedding the interactive component in the vertical blanking interval.

In another aspect of the invention, the content is a digital video signal and generating the interactive program includes encapsulating the interactive components in a first elementary stream of a digital video broadcast transport stream and adding the content to a second elementary stream of the video broadcast transport stream.

In another aspect of the invention, the communications medium may be a cable television network, a satellite television network, or a wide area network.

In another aspect of the invention, the participant response includes an audience approval rating of the interactive program.

In another aspect of the invention, the participant response includes an answer to a poll question.

In another aspect of the invention, the interactive component includes additional information about the content.

In another aspect of the invention, the interactive component is a uniform resource locator of a resource coupled to the interactive programming transceiver through a wide area network. The resource may be a Web site where a participant can complete a commercial transaction such as purchasing an advertised product.

In another aspect of the invention, the interactive component includes an advertisement.

BRIEF DESCRIPTION OF THE DRAWING(S)

FIG. 15 is a diagram of the type of information including in interactive components in accordance with an exemplary embodiment of the present invention.

DETAILED DESCRIPTION OF THE INVENTION

Figure 1:
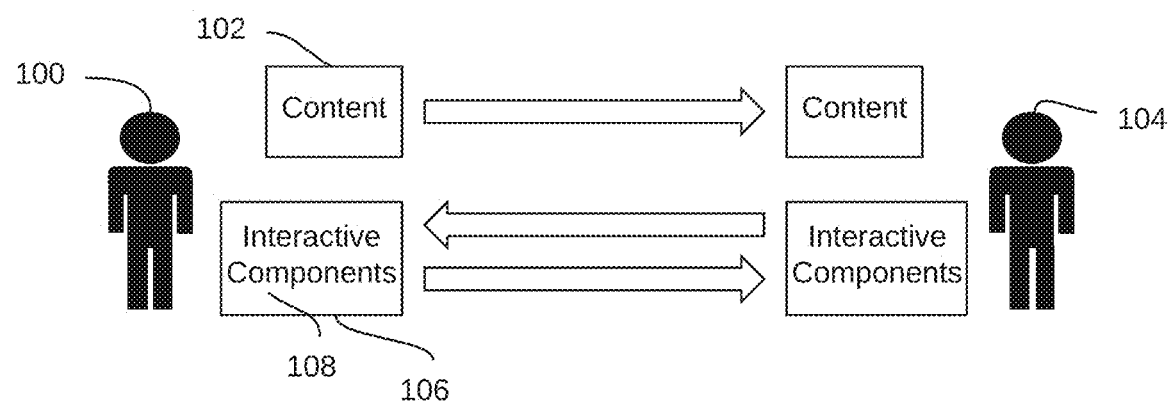
FIG. 1 is a block diagram of an interactive programming process in accordance with an exemplary embodiment of the present invention.

FIG. 1 is a block diagram of an interactive programming process in accordance with an exemplary embodiment of the present invention. An interactive programming producer 100 generates media content 102 for transmission and presentation to a participant 104. The media content can be for any purpose, such as for entertainment or educational purposes. Associated with the content are interactive components 106 that are also transmitted to the participant. The combination of the content and associated interactive components are herein termed interactive programming. In operation, the participant observes the content and interacts with the interactive components and the participant's interactions 108 are then transmitted back to the producer.

In this embodiment of an interactive programming process, an interactive programming environment includes two communications channels. In a first or forward channel, interactive programming is transmitted by a producer to a participant. In a second or back channel, a participant's reactions to the interactive programming are transmitted from the participant to the producer. The communications channels may be included in a single medium capable of managing high bandwidth communications in two directions, or may be distributed across multiple media with each medium providing a separate portion of the interactive programming in a distributed manner.

Figure 2:
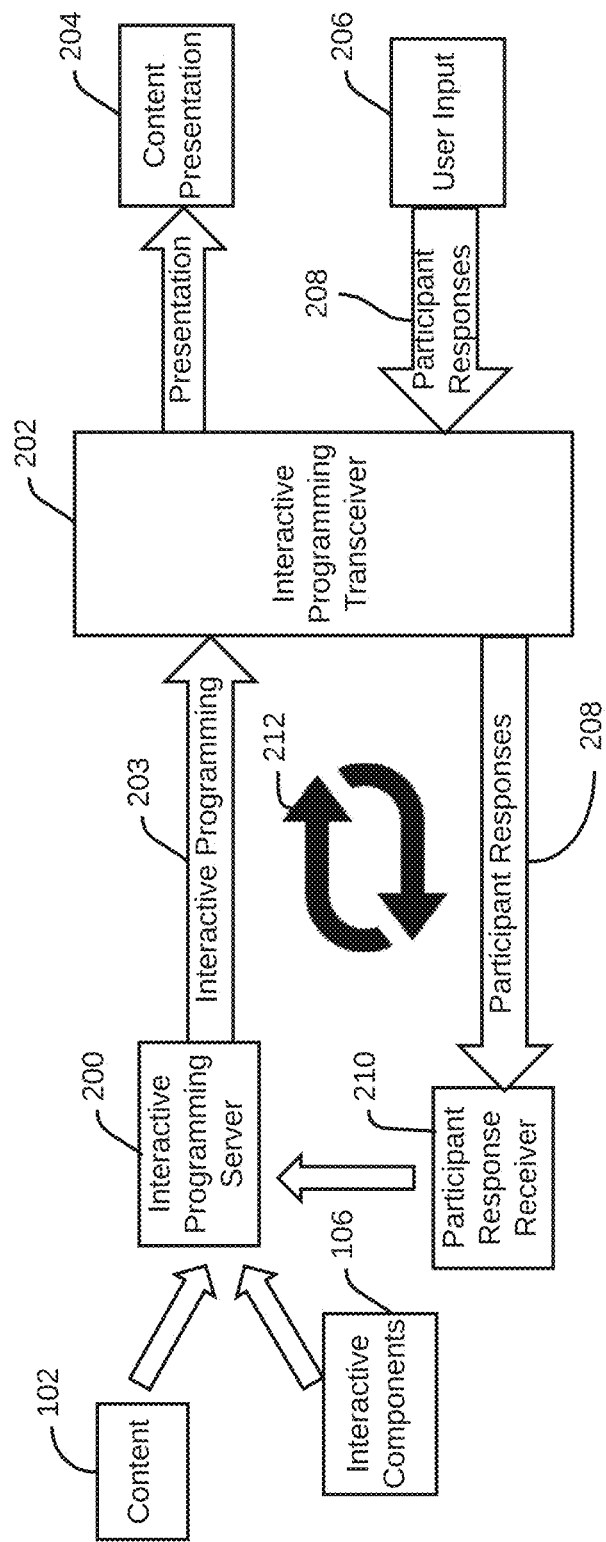
FIG. 2 is a block diagram of a system for generating interactive programming for a single two-way communications channel in accordance with an exemplary embodiment of the present invention.

FIG. 2 is a block diagram of a system for generating interactive programming for distribution over a single communication medium in accordance with an exemplary embodiment of the present invention. A producer provides media content 102 and specifications for interactive components 106 for processing in an interactive programming server 200. The interactive programming server receives the content and specifications for interactive components and uses them to generate interactive programming that is transmitted to an interactive programming transceiver device 202 through a forward channel 203. The interactive programming transceiver device separates the content from the interactive components of the interactive programming and generates a content presentation 204 that is presented to a participant. The participant responds to the content presentation and interacts with the interactive components using a user input device 206 to provide participant responses to the interactive programming transceiver which then transmits the participant responses to a participant response receiver 210 through a back channel 208 included in the same medium as the forward channel. The participant responses are then transmitted to the interactive programming server which uses the participant responses along with the content and interactive components to generate new interactive programming that is transmitted to the interactive transceiver device for presentation to the participant. This process is repeated continuously as a processing loop 212 to generate a continuous transmission of interactive programming.

Figure 3:
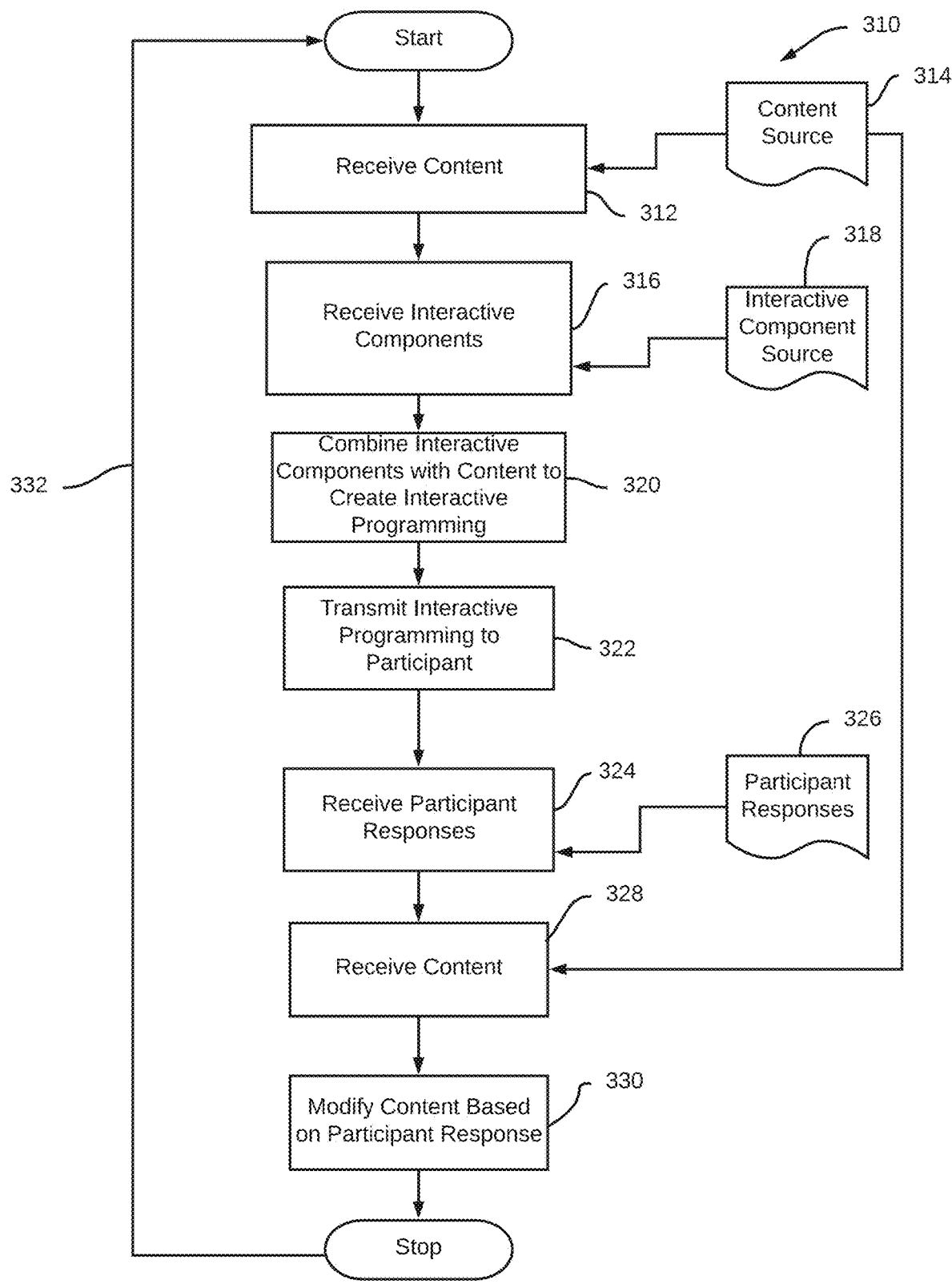
FIG. 3 is a process flow diagram of an interactive programming server process for generating interactive programming in accordance with an exemplary embodiment of the present invention.

FIG. 3 is a process flow diagram of an interactive programming generation process as implemented in an interactive programming server in accordance with an exemplary embodiment of the present invention. An interactive programming server process 310 receives (312) content from a content source 314 and receives (316) interactive components from an interactive component source 318. The interactive programming server process combines (320) the content and interactive components to create interactive programming for transmission to a participant. The interactive programming server process then transmits (322) the interactive programming to the participant.

After a participant interacts with the interactive components of the interactive programming, the interactive programming server process receives (324) participant responses 326. The interactive programming server then receives (328) additional content from the content source and modifies (330) the additional content using the participant responses. The process then repeats (332) in a loop indefinitely thus producing a continuous source of interactive programming for use by a participant.

Figure 4:
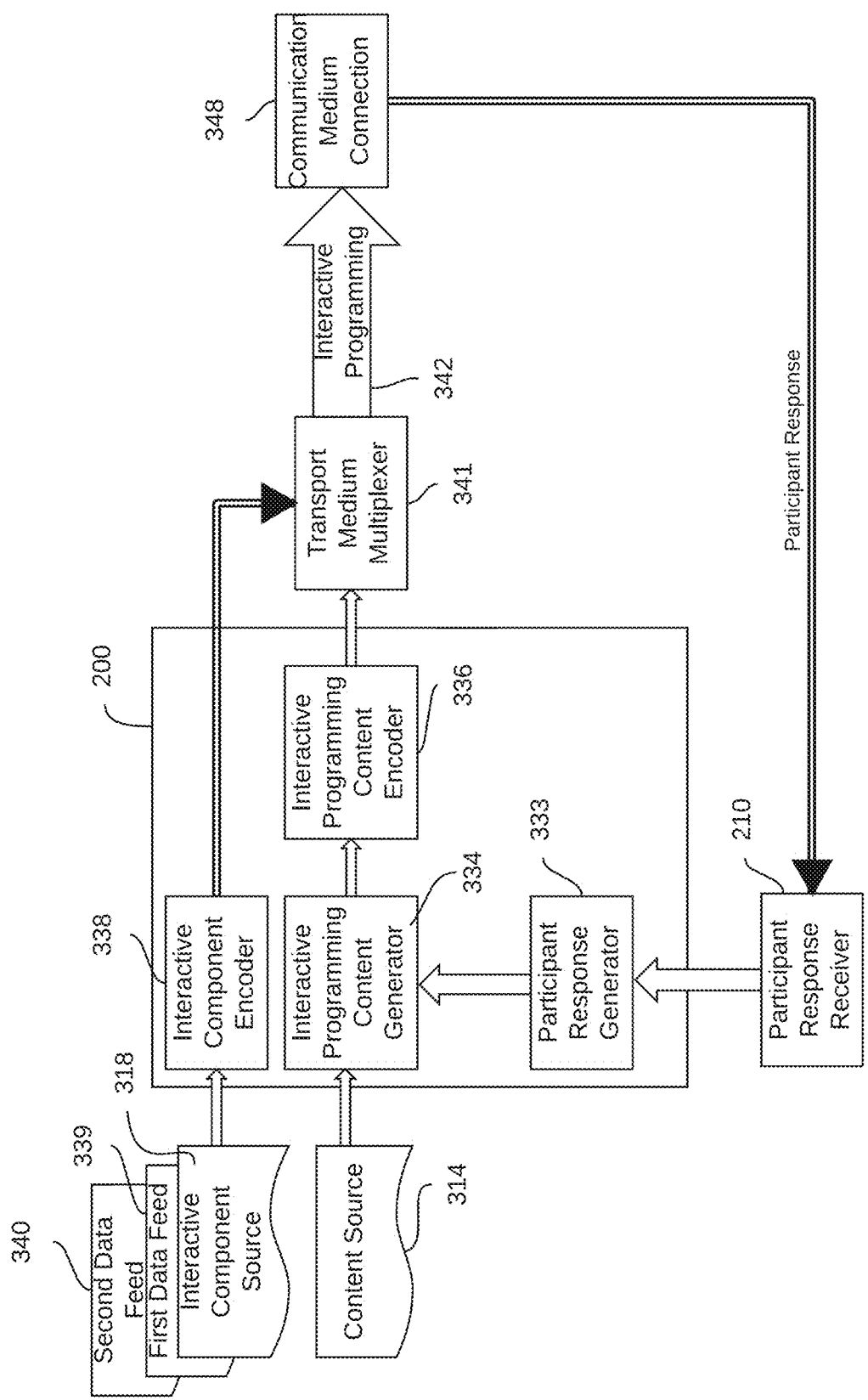
FIG. 4 is a block diagram of an interactive programming server in accordance with an exemplary embodiment of the present invention.

FIG. 4 is an architecture diagram of an interactive programming server in accordance with an exemplary embodiment of the present invention. An interactive programming server 200 includes a participant response content generator 333 that generates participant response content using participant responses received by a participant response receiver 210 coupled to a back channel included in a communications medium 348. The participant response content is combined with content received from a content source 314 to create interactive programming content by an interactive content generator 334. The interactive programming content is then transmitted to an interactive programming content encoder that encodes the interactive programming content into a format suitable for transport through a forward channel in the communications medium. The interactive programming server also includes an interactive component encoder 338 that receives interactive components from an interactive component source 318. The interactive component source includes a plurality of independent data feeds as exemplified by a first data feed 339 and a second data feed 340. The data feeds correspond to differing types of interactive components that may be used in an interactive program. The interactive component encoder encodes the interactive components into a data format suitable for transport through a forward channel in the communications medium. The encoded interactive programming content and encoded interactive components are then combined by transport medium multiplexer 341 to generate interactive programming 342 that is ultimately transmitted to the participant through communications medium.

In one interactive programming server in accordance with an exemplary embodiment of the present invention, the output of the interactive programming content encoder is a MPEG-2 encoded data stream. The output of the interactive component encoder is an UDP/IP data stream. These data streams are received by the transport multiplexer that generates the interactive programming by encapsulating the UDP/IP data stream along with the MPEG-2 data stream for inclusion in a Digital Video Broadcast (DVB) transport stream. A suitable commercially available transport multiplexer is a model TMX-2010 Transport Multiplexer available from Motorola, Inc. of Schaumburg Ill., USA.

In other interactive programming servers in accordance with exemplary embodiments of the present invention, other transport multiplexers may be used. For example, transport multiplexers accepting inputs in the form of MPEG-4 streams or transport multiplexers generating a transport stream suitable for transmission using the DOCSIS standard may also be used.

Figure 5:
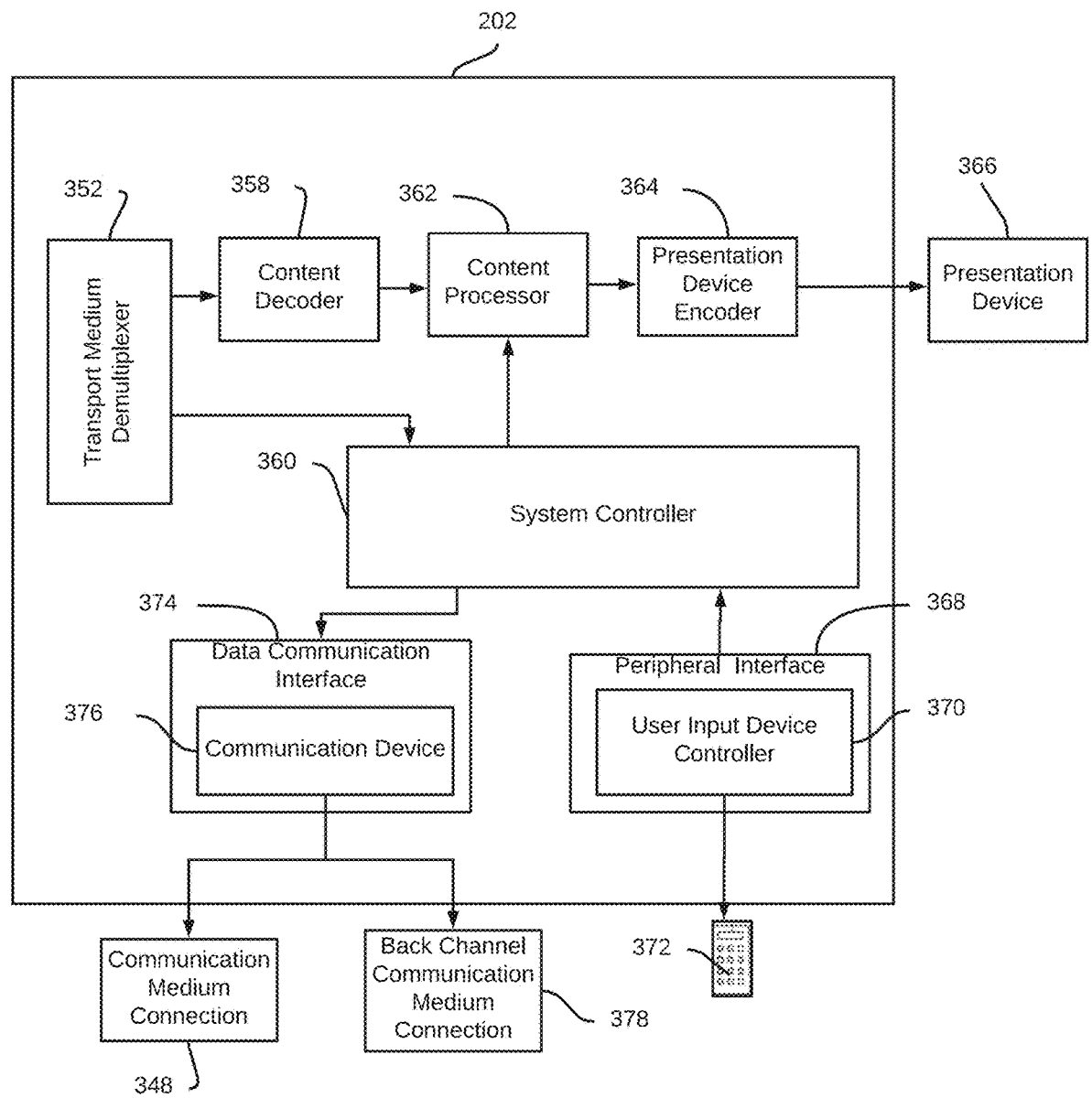
FIG. 5 is a block diagram of an interactive programming transceiver in accordance with an exemplary embodiment of the present invention.

FIG. 5 is a block diagram of an interactive programming transceiver in accordance with an exemplary embodiment of the present invention. An interactive transceiver 202 includes a transport medium demultiplexer 352 that receives interactive programming from a forward channel included in a communications medium 348. The transport medium demultiplexer separates the content and interactive components of an interactive program. The content is transmitted to a content decoder 358 that decodes the content into a format suitable for internal representation of the content for further processing. The interactive components of the interactive program are transmitted to a system controller 360. The system controller uses the interactive components to generate participant interface content that may be recombined with the decoded content in a content processor 362. The decoded content and any combined participant interface content are then transmitted to a presentation device encoder 364 that encodes the decoded content and any combined participant interface content into a format suitable for transmission to a presentation device 366.

The system controller is also coupled to a peripheral interface 368 having a user input device controller 370 for reception of participant responses transmitted by a user input device 372. A participant uses the user input device to transmit the participant's response to the presentation of the content. The system controller receives the participant's responses and uses a data communication interface 374 having a first communication device 376 to transmit the participant responses to the interactive programming server through a back channel included in the communications medium. Alternatively, the communications device may transmit the participant responses to the interactive programming server through a separate back channel communications medium 378. A suitable commercially available interactive programming transceiver is a DCT2000 set-top terminal available from Motorola, Inc. of Schaumburg Ill., USA.

Figure 6:
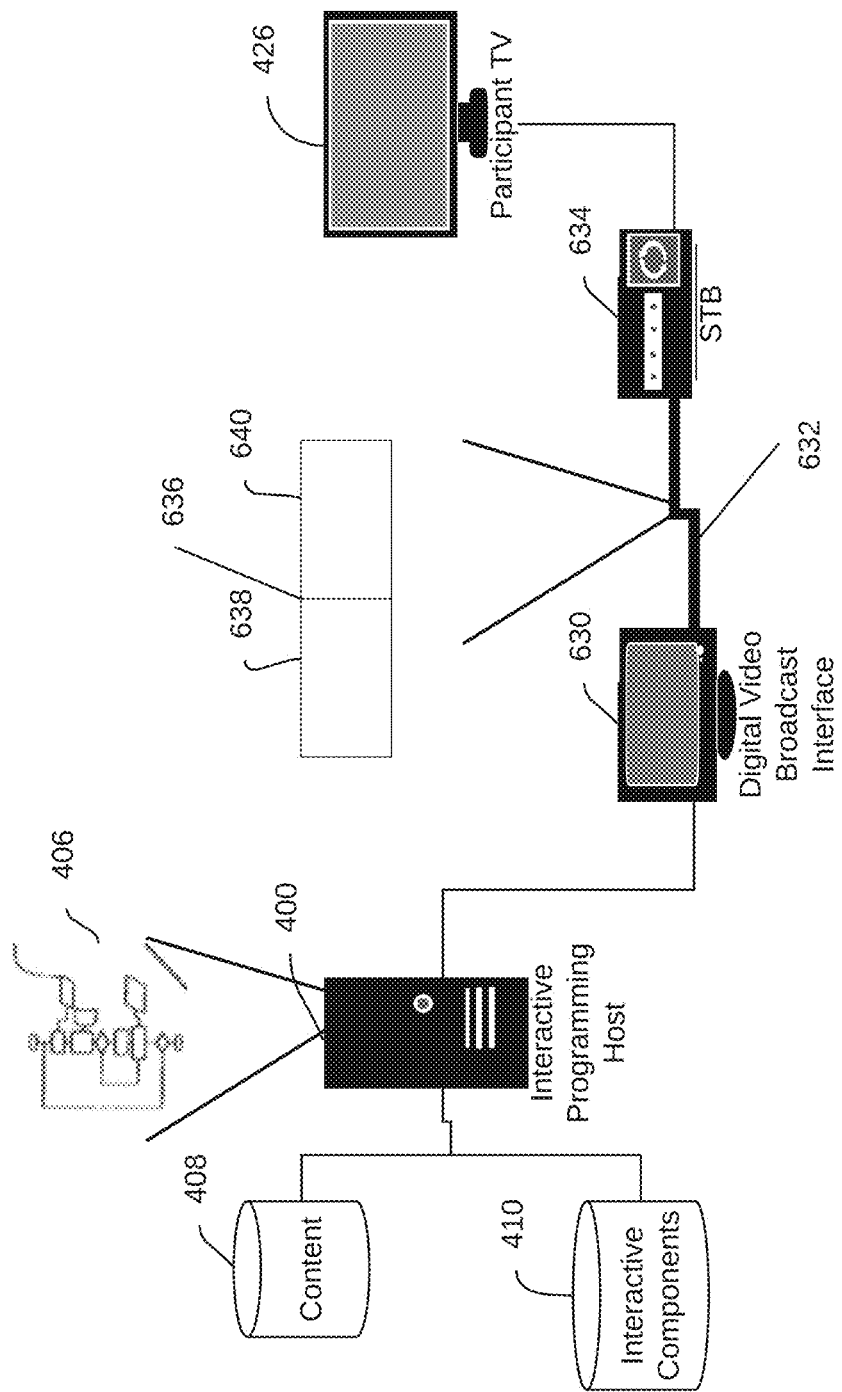
FIG. 6 is a deployment diagram depicting embedding interactive components in a digital video broadcast transport stream in accordance with an exemplary embodiment of the present invention.

FIG. 6 is a deployment diagram depicting embedding interactive components in a DVB transport stream in accordance with an exemplary embodiment of the present invention. An interactive programming host 400 is coupled to a content source 408 and an interactive component source 410 as previously described. An interactive programming server 406 hosted by the interactive programming host embeds interactive components from the interactive component source into a DVB transport stream signal 636. The DVB transport stream includes a plurality of elementary streams, with each elementary stream corresponding to a separate program. In one embodiment of interactive programming in accordance with an exemplary embodiment of the present invention, the interactive components are included in a first elementary stream 638 while the interactive programming content is included in a second elementary stream 640.

Once the interactive programming server has generated the interactive programming, the interactive programming host uses a DVB network interface or cable head 630 to transmit the interactive programming over a DVB network 632 to a participant's digital set-top box 634. The DVB signal is received by the set-top box and the interactive programming content and interactive components are separated out of the DVB transport stream and processed as previously described.

Figure 7:
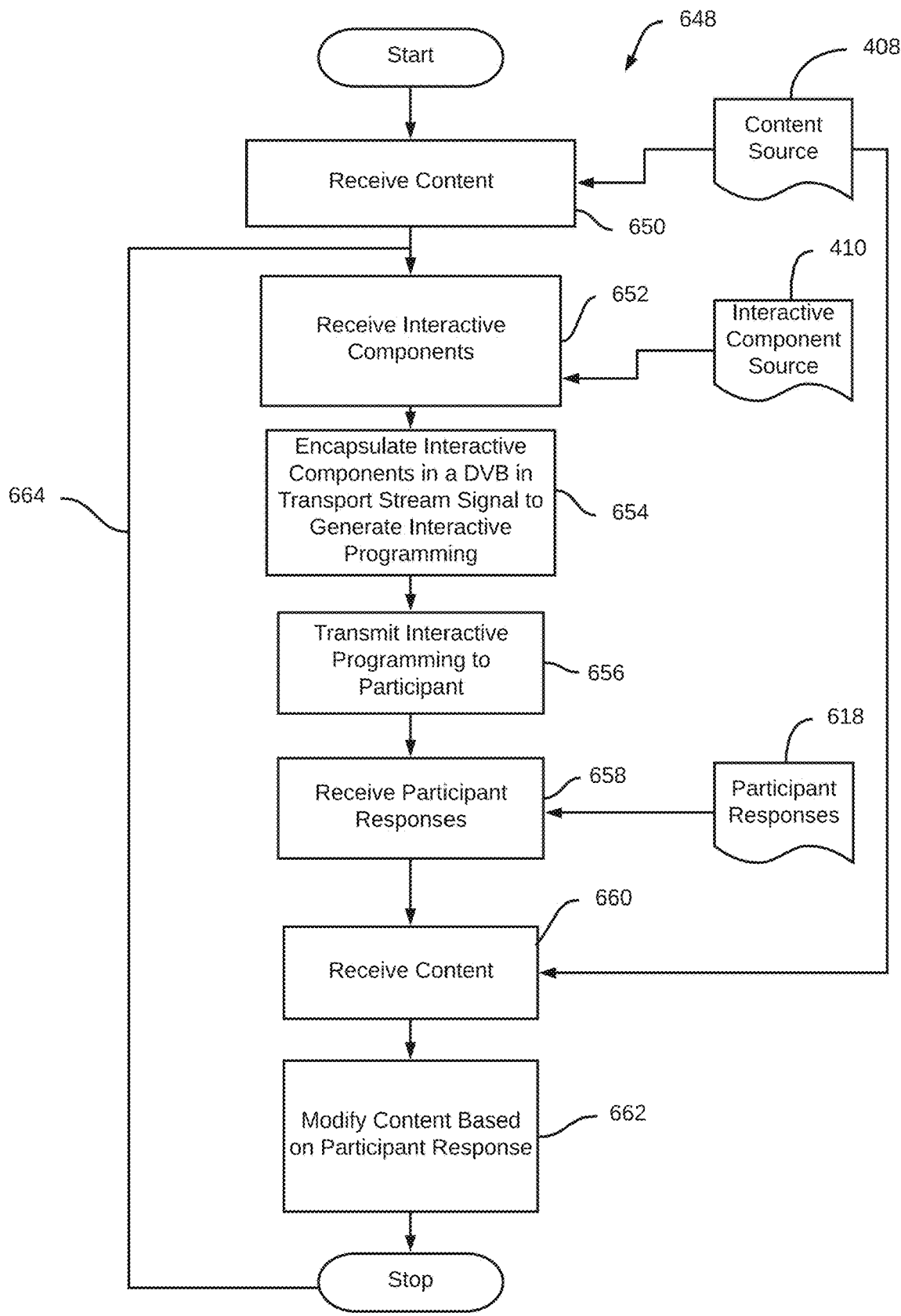
FIG. 7 is a process flow diagram of an interactive programming server process used to generate iVOD interactive programming for a digital video broadcast transport stream in accordance with an exemplary embodiment of the present invention.

FIG. 7 is a process flow diagram of an interactive programming server process used to generate iVOD interactive programming for a DVB transport stream in accordance with an exemplary embodiment of the present invention. An interactive programming server process 648 receives (650) content from a content source 408 and receives (652) interactive components from an interactive component source 410. The interactive programming server process converts the content into a digital video signal and encapsulates the interactive components into a DVB transport stream to generate (654) iVOD interactive programming. The interactive programming server process then transmits (656) the iVOD interactive programming to the participant.

After a participant interacts with the interactive components of the iVOD interactive programming, the interactive programming server receives (658) participant responses 618. The interactive programming server then receives (660) additional content from the content source and modifies (662) the content using the participant responses. The process then repeats (664) in a loop indefinitely thus producing continuous source of iVOD interactive programming for use by a participant.

Figure 8:
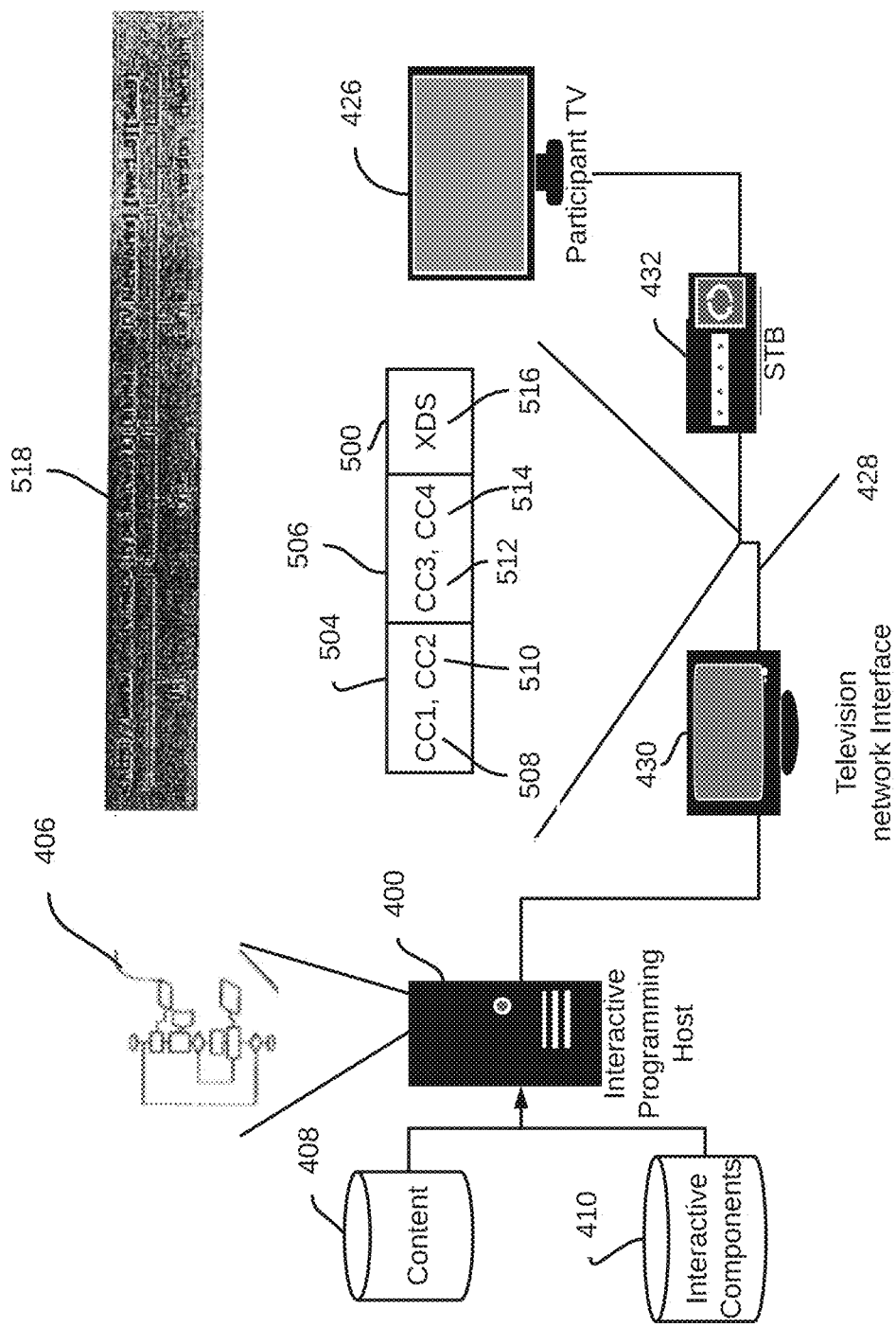
FIG. 8 is a deployment diagram depicting embedding interactive components in a television signal using a vertical blanking interval in accordance with an exemplary embodiment of the present invention.

FIG. 8 is a deployment diagram depicting a system using interactive components embedded in a vertical blanking interval of a television signal in accordance with an exemplary embodiment of the present invention. An interactive programming host 400 is coupled to a content source 408 and an interactive component source 410 as previously described. An interactive programming server 406 hosted by the interactive programming host embeds interactive components from the interactive component source into a Vertical Blanking Interval (VBI) of a television signal 500 in text fields that are specified in a VBI encoding standard. In one embodiment of interactive programming in accordance with an exemplary embodiment of the present invention, the interactive components are included in a first field 504 and a second field 506. The first field includes a first captioning info illation 508 and a second captioning information 510 text stream. Field 2 includes a third captioning information 512 and a fourth captioning information 514 text string as well as extended Data Service (XDS) information 516 encoded in a series of packets. The fields are described in table 1a and table 1b below.

TABLE 1a

| Field 1 Packets | | | Data |
| --- | --- | --- | --- |
| Name | Field | Channel | Description |
| CC1 | 1 | 1 | Primary Synchronous Caption Service |
| CC2 | 1 | 2 | Special Non-Synchronous Use Captions |
| T1 | 1 | 1 | First Text Service |
| T2 | 1 | 2 | Second Text Service |

TABLE 1b

| Field 2 Packets | | | |
| --- | --- | --- | --- |
| Name | Field | Data Channel | Description |
| CC3 | 2 | 1 | Secondary Synchronous Caption Service |
| CC4 | 2 | 2 | Special Non-Synchronous Use Captions |
| T3 | 2 | 1 | Third Text Service |
| T4 | 2 | 2 | Fourth Text Service |
| XDS | | | eXtended Data Services |

There are several different classes of XDS packets encapsulating information about a broadcast program. For example, defined XDS packet classes include Current Class (information about the current program such as the title, length, rating, elapsed time, audio services, caption services, and aspect ratio), Future Class (the same information for an upcoming program), Channel Information Class (information such as the network name, station call letters, native channel number and tape delay), Miscellaneous Class (containing the time of day and the local time zone) and Public Service Class (severe weather warnings). In addition, Reserved and Undefined Classes are set aside for future expansion and proprietary applications.

A complete definition of a XDS packets may be found in *Recommended Practice for Line 21 Data Service*, Electronics Industries Association, EIA-608 (drafts Oct. 12, 1992 and Jun. 17, 1993).

The text fields may also be used to encode links to other types of data. For example, if the interactive programming system includes an Internet Protocol (IP) back channel, the links may be in the form of Uniform Resource Locators (URLs). Such a link is herein termed a "trigger". In one interactive programming system in accordance with an exemplary embodiment of the present invention, a trigger 518 includes a URL field for specifying the URL of a resource in an IP network, a type field for specifying what type of network is used to access the URL, a name field for a display name used for the resource, a version field for specifying the version of the trigger, and a check sum field used to confirm that the trigger was accurately transmitted to a participant's STB 432.

Once the interactive programming server has generated the interactive programming, the interactive programming host uses a cable television network interface 430 to transmit the interactive programming to the participant's STB.

Figure 9:
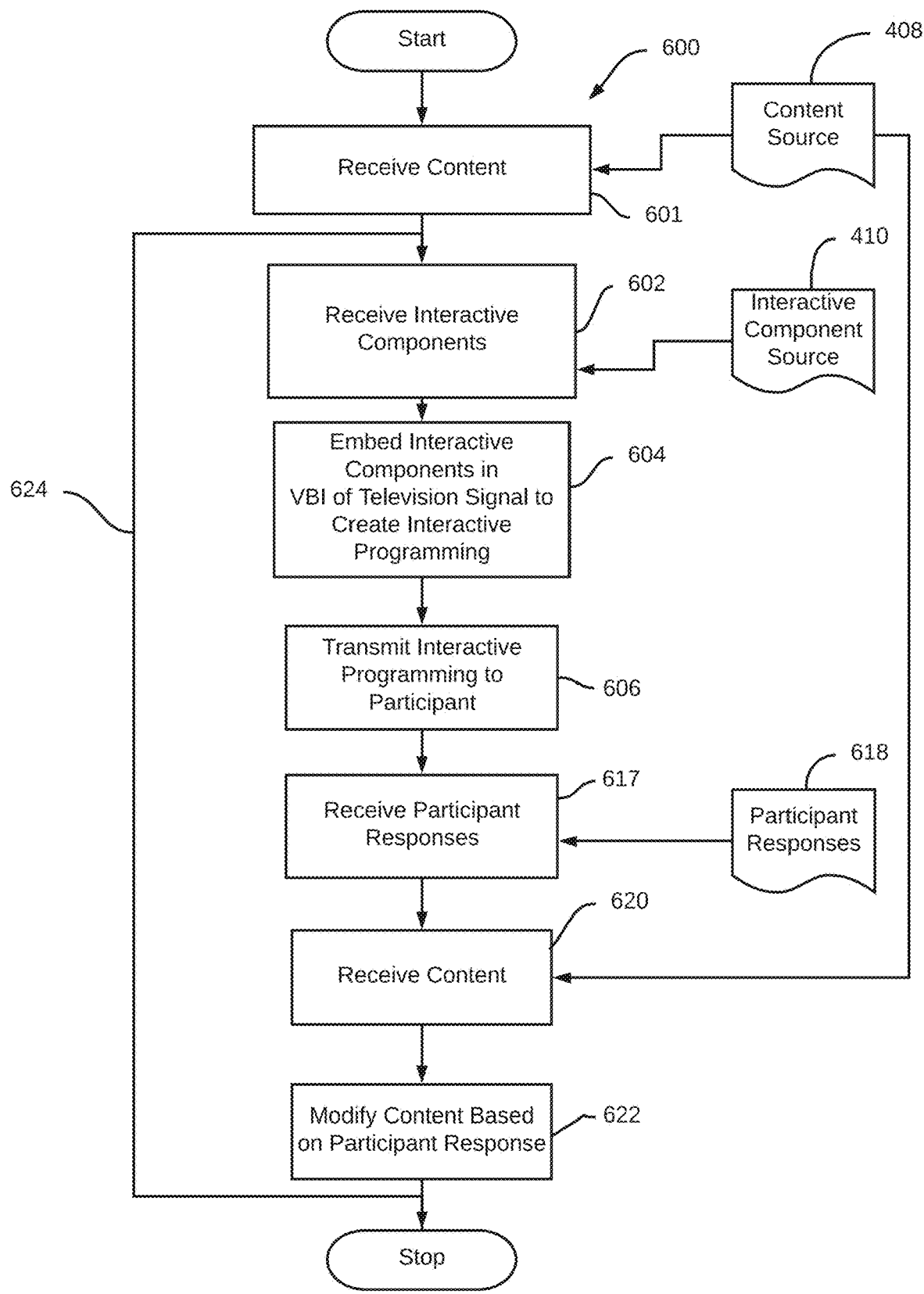
FIG. 9 is a process flow diagram of an interactive programming server process used to generate iVOD interactive programming in accordance with an exemplary embodiment of the present invention.

FIG. 9 is a block diagram of an interactive programming server process used to generate iVOD interactive programming in accordance with an exemplary embodiment of the present invention. An interactive programming server process 600 receives (601) content from a content source 408 and receives (602) interactive components from an interactive component source 410. The interactive programming server process converts the content into a television signal and embeds (604) the interactive components into the VBI of the television signal to generate iVOD interactive programming. The interactive programming server process then transmits 606 the iVOD interactive programming to the participant.

After a participant interacts with the interactive components of the iVOD interactive programming, the interactive programming server receives (617) participant responses 618. The interactive programming server then receives (620) additional content from the content source and modifies (622) the content using the participant responses. The process then repeats (624) in a loop indefinitely thus producing continuous source of iVOD interactive programming for use by a p articip ant.

Figure 10:
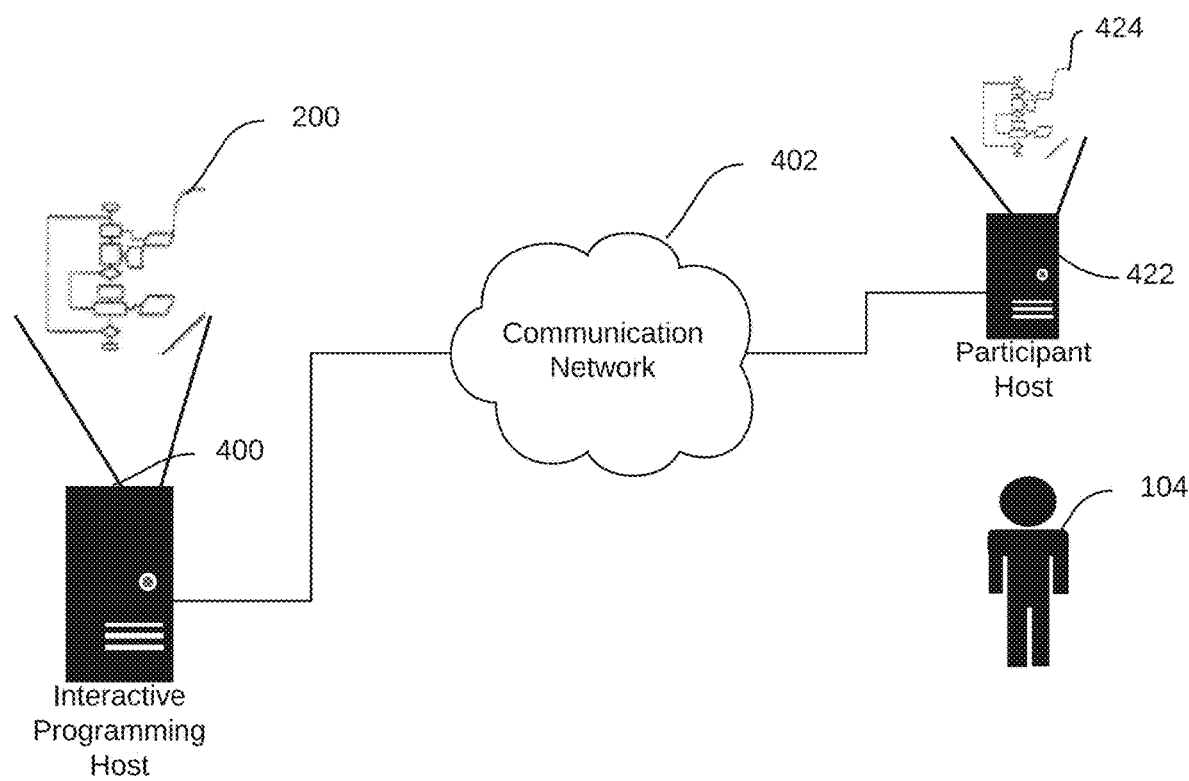
FIG. 10 is a deployment diagram of a system for delivering interactive programming wherein the delivery medium is a wide area network in accordance with an exemplary embodiment of the present invention.

FIG. 10 is a deployment diagram of a system for delivering interactive programming wherein the delivery medium is a wide area network in accordance with an exemplary embodiment of the present invention. An interactive programming server 200 is hosted by an interactive programming host 400 that is operably coupled to a communications network 402. A participant host 422 coupled to the communications network hosts a participant client 424. In the case where the communications network is the Internet, the participant client may be a Web browser or other client capable of communicating using the IP suite of communications protocols. In such a system, the Internet is a medium including both a forward channel used to transmit interactive programming to a participant 104 and a back channel used to transmit participant responses back to the interactive programming server.

Figure 11:
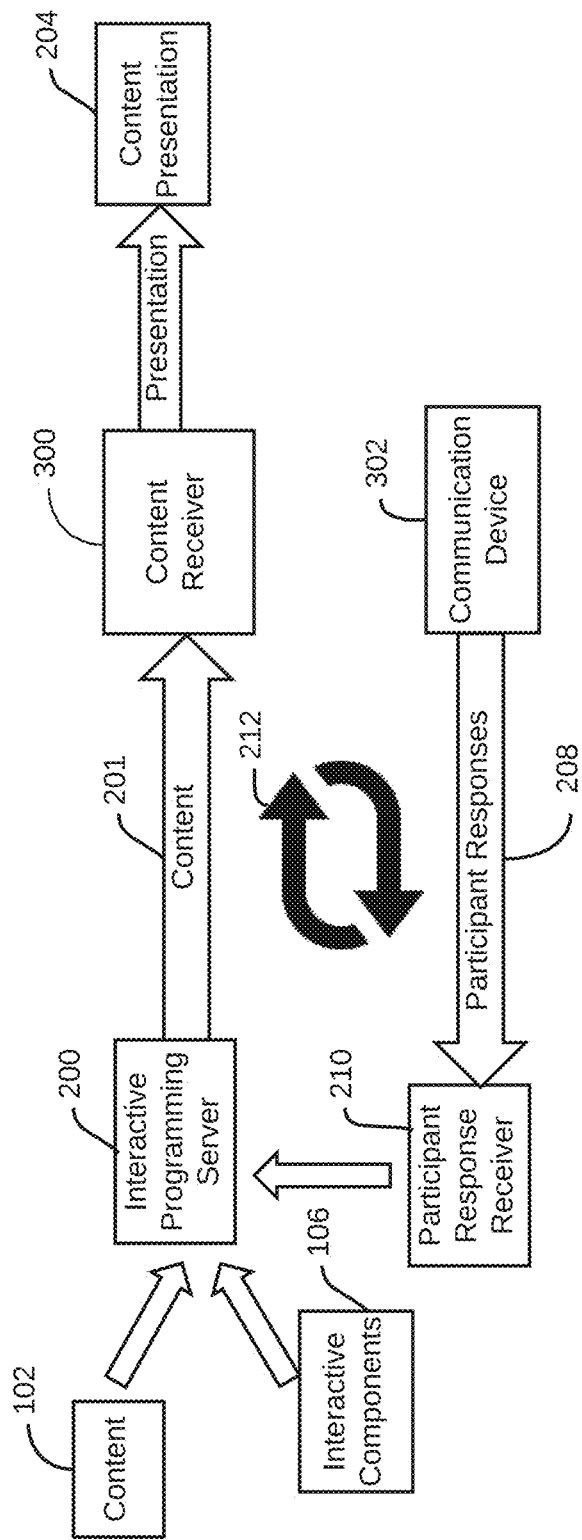
FIG. 11 is a block diagram of a system for generating interactive programming for multiple communications channels in accordance with an exemplary embodiment of the present invention.

FIG. 11 is a block diagram of a system for generating interactive programming for multiple communications channels in accordance with an exemplary embodiment of the present invention. In this system, content presentation functions and user input functions of an interactive programming transceiver as illustrated in FIG. 2 are separated and distributed across more than one device, with each device having its own communication medium. As previously described, a content producer provides content 102 and interactive components 106 to an interactive programming server 200 as before. However, instead of generating interactive programming including both content and interactive programming, the interactive programming server generates interactive programming content for transmission through a forward channel 201 to a content receiver 300. The content receiver receives the content and generates a content presentation 204 for presentation to a participant. The participant uses a separate communications device to transmit participant responses through a back channel 208 to the participant response receiver 210 for use by the interactive programming server in generating new interactive programming in an iterative process. Thus, an interactive programming loop 212 may be maintained by coordination of the transmission of content through a forward channel to a participant and receiving participant responses to the content through a back channel wherein the forward and back channels are carried by different media.

Figure 12:
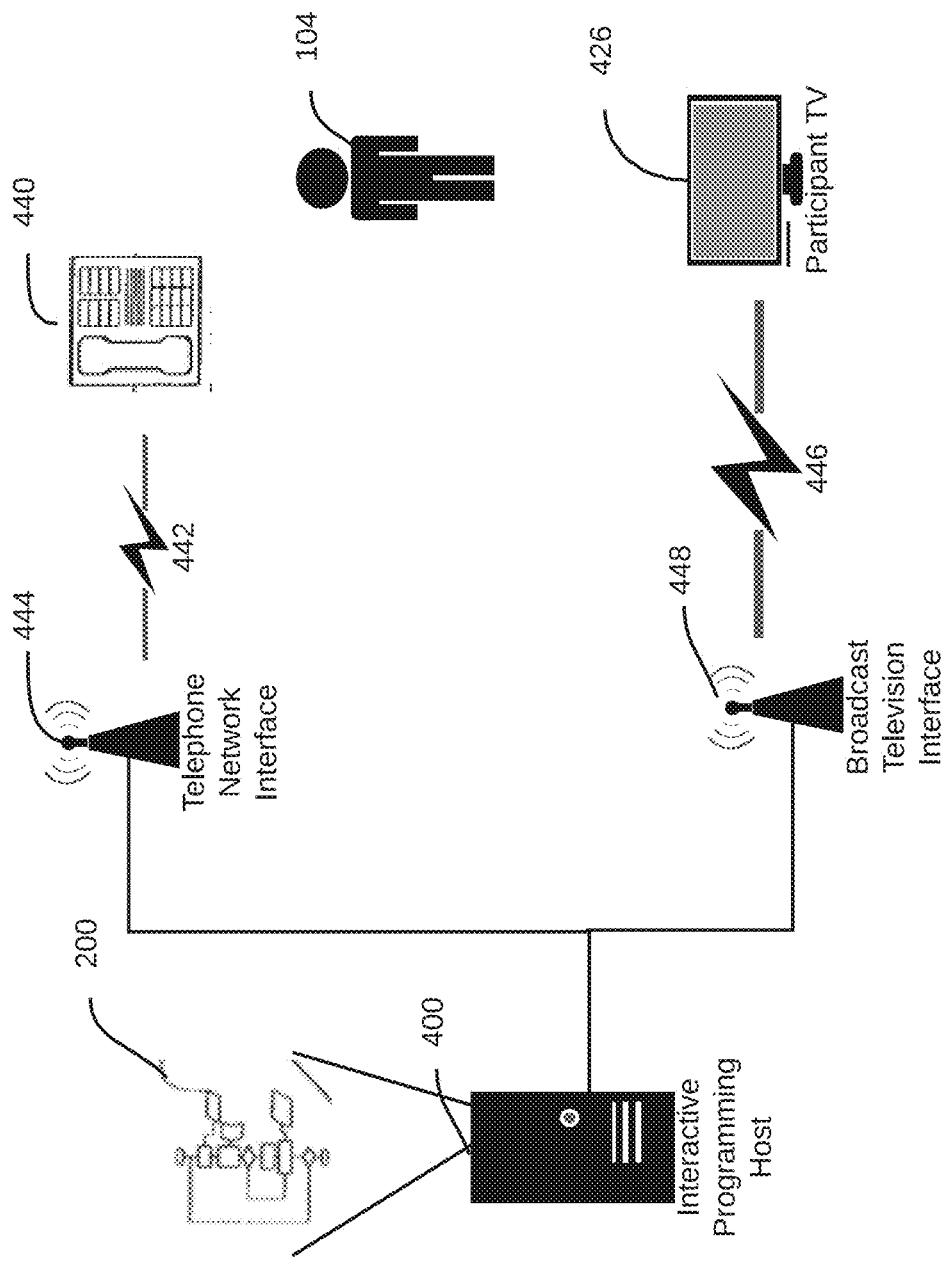
FIG. 12 is a deployment diagram of a system for delivering interactive programming wherein a medium for a forward channel is broadcast television and a medium for a back channel is a telephone system in accordance with an exemplary embodiment of the present invention.

FIG. 12 is a deployment diagram of a system for delivering interactive programming wherein a medium for a forward channel is broadcast television and a medium for a back channel is a telephone system in accordance with an exemplary embodiment of the present invention. As noted previously, multiple communications media may be used to transmit interactive programming to a participant through a forward channel and receive resultant participant responses through a back channel. In this configuration, the interactive programming host is coupled to a participant television 426 through a broadcast television network 446 by a broadcast television network interface 448. The interactive programming server may then use the broadcast television network to transmit interactive programming to the participant television.

The interactive programming host is also coupled to a telephone network 443 by a telephone network interface 444. As such, the interactive programming server may receive participant responses from the participant using a participant telephone 440 through the telephone network. In this system, the back channel for participant responses is carried on the telephone network communications medium.

In one embodiment of interactive programming in accordance with an exemplary embodiment of the present invention, the interactive programming is associated with its own telephone extension number. In this embodiment of interactive programming, a participant dials a telephone number to access a Private Branch eXchange (PBX) telephone system and then the participant enters the extension number associated with the interactive program.

Figure 13:
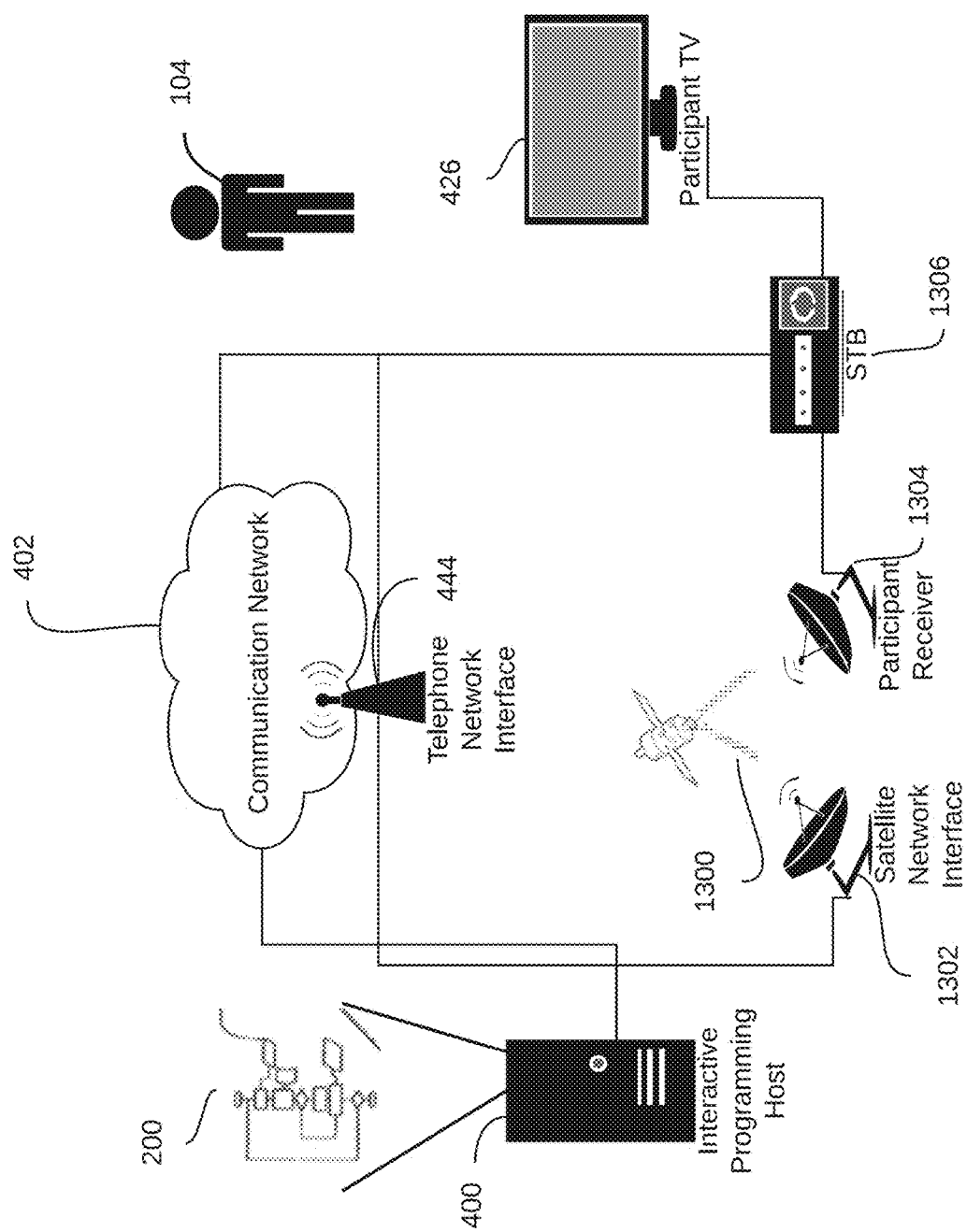
FIG. 13 is a deployment diagram of a system for delivering interactive programming wherein a medium for a forward channel is a satellite television network and a medium for a back channel is either a telephone system or a communications network in accordance with an exemplary embodiment of the present invention.

FIG. 13 is a deployment diagram of a system for delivering interactive programming wherein a medium for a forward channel is a satellite television network and a medium for a back channel is either a telephone system or a communications network in accordance with an exemplary embodiment of the present invention. In this system, the interactive programming host 400 is coupled to a participant television 426 through a satellite television network 1300 by a satellite television network interface 1302. The interactive programming server may then use the satellite television network to transmit interactive programming to the participant television through a satellite television network STB 1304.

The interactive programming host is also coupled to a telephone network by a telephone network interface 444. The satellite television network STB uses the telephone network to transmit participant responses to the interactive programming host. In this system, the back channel for participant responses is carried on the telephone network communications medium.

In another system for delivering interactive programming wherein a medium for a forward channel is satellite television network in accordance with an exemplary embodiment of the present invention, the back channel is a communications network, such as wide area network 402. In this system, the interactive programming host is coupled to the communications network and the satellite television network STB transmits participant responses to the interactive programming host via the communications network.

Figure 14A:
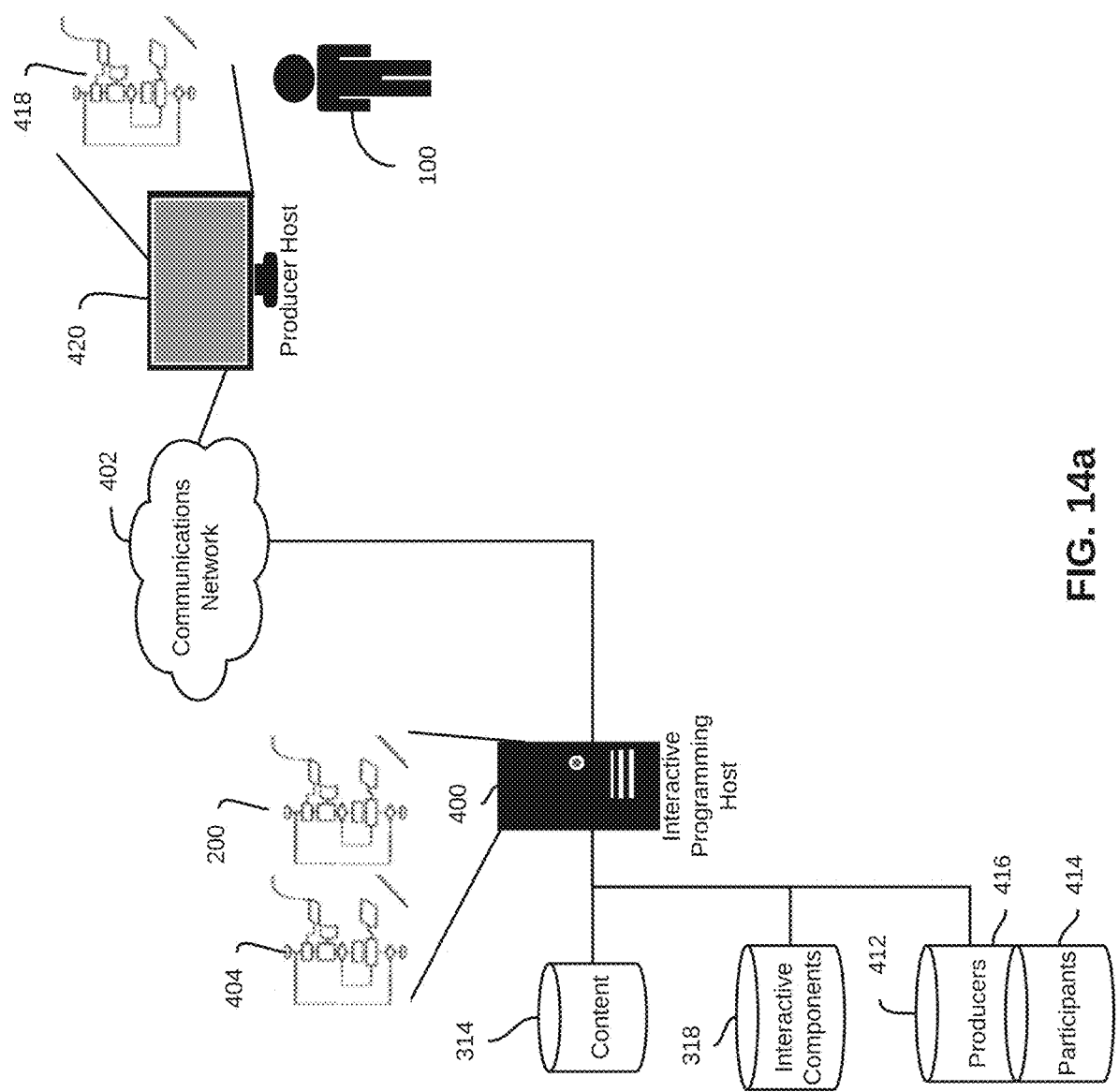
FIG. 14a is a block diagram of a system for the production of interactive programming in accordance with an exemplary embodiment of the present invention.

FIG. 14a is a block diagram of a system for the production of interactive programming in accordance with an exemplary embodiment of the present invention. The system provides user interface features allowing an interactive programming producer 100 to produce interactive programming for transmission to a participant. The system includes an interactive programming host 400 coupled to a communications network 402 such as the Internet. The interactive programming host hosts a user interface server 404 for management of user interfaces used by both the participant and the producer. The interactive programming host also hosts an interactive programming server 200 for generation of interactive programming using content from a content source 314 and interactive components from an interactive component source 318. The interactive programming host is further coupled to a database 412 for storage of information about participants 414 and information about producers 416. As the interactive programming host is coupled to a communications network, a producer may access the user interface server using the communications network and a producer client 418 hosted by a producer host 420.

In operation, the producer uses the producer client to access the user interface server via the communications network. Through a series of user interactions, the producer configures an interactive program by specifying content and interactive components. The interactive programming is then transmitted by the interactive programming server to a participant using a forward channel as previously described. The participant transmits participant responses back to the interactive programming server via a back channel as previously described. The interactive programming host may be coupled to multiple communications media which carry forward channels and back channels in various combinations.

The above described interactive programming systems may be used to deliver interactive programming having a variety of different purposes and structures. In one interactive programming system in accordance with an exemplary embodiment of the present invention, the interactive programming system is used to distribute interactive programming in the form of talk shows. Such an interactive programming system is more fully described in U.S. patent application Ser. No. 10/123,618, entitled "METHOD AND APPARATUS FOR INTERNET-BASED INTERACTIVE PROGRAMMING" and U.S. patent application Ser. No. 10/222,461, entitled "METHOD AND APPARATUS FOR INTERACTIVE PROGRAMMING USING CAPTIONING". One feature of the interactive programming system used to generate and distribute talk shows is that creators of the talk shows may archive their talk shows for later presentation in "on-demand" style formats including interactive Video On Demand (iVOD). Other interactive programming content sources may include any programming source. For example, entertainment programs, educational programs, and political talk shows can be enhanced to create iVOD interactive programming.

iVOD is a medium that exploits the ability to embed interactive components in a television or video signal. For an analog television signal, a Vertical Blanking Interval (VBI) is used to embed interactive components in the television signal. The interactive components may be included in closed captioning text streams that are part of the VBI in the television signal. For a digital video signal, the interactive components are embedded as in the transport medium along with interactive programming content.

Figure 14B:
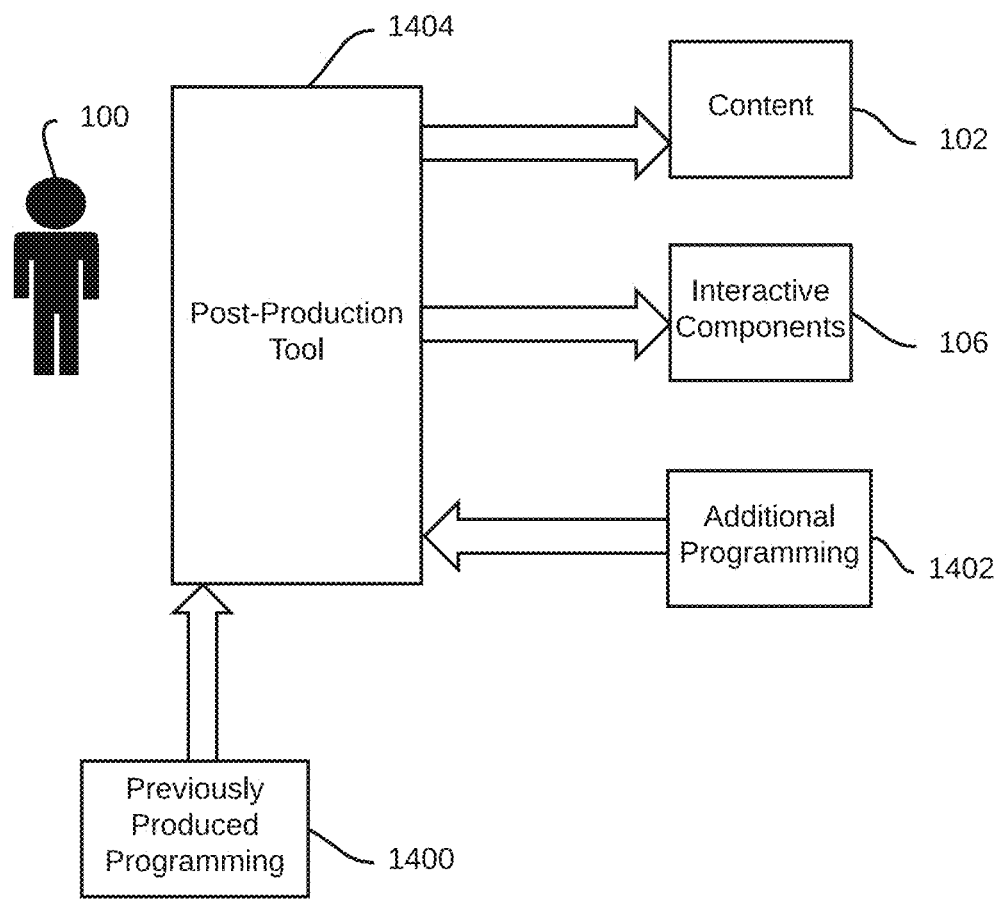
FIG. 14b is a block diagram of a post-production tool for generation of interactive programming content and interactive components in accordance with an exemplary embodiment of the present invention.

FIG. 14b is a block diagram of a software tool for generation of interactive programming content and interactive components in accordance with an exemplary embodiment of the present invention. Production of the interactive programming is a multistep process. A producer 100 obtains previously produced programming 1400 and adds additional programming 1402 to generate content 102 and interactive components 106 using a post-production tool 1404. The post-production tool allows the producer to edit the previously produced programming and synchronize the additional programming to the previously produced programming as embedded interactive components. Once the content and interactive programming are generated, they may be stored and distributed to the participant in an "on-demand" mode through various distribution channels and broadcast media.

The post-production tool provides a variety of services to the producer such as separate audio and text tracks with embedded time codes that may be synchronized with the content. The post-production tool may also be used to combine additional programming with the previously produced programming as a video signal embedded in the content. In addition, the post-production tool allows the creation of interactive components, such as polls that offer two, three, or four choice formats with a simple text entry user interface. Finally, the post-production tool allows the creation of time coded tcommerce links for product placement as an interactive component.

FIG. 15 is a diagram of the type of information including an interactive components in accordance with an exemplary embodiment of the present invention. The interactive components may include multiple datafeeds that are synchronized with the content of an interactive program. In the example, the content is included as a transcript 607 in order to illustrate synchronization of the datafeeds with the content. A first datafeed 608 includes "pop-up facts" about the subject matter of the content. A second datafeed 610 includes additional information about the subject matter of the content. A third data feed 612 includes comments and poll results from participants in the interactive programming. A fourth datafeed 614 includes proposals for commercial transactions. Each of the datafeeds may either include information directly or may include links as triggers to other data resources as previously described.

Figure 16:
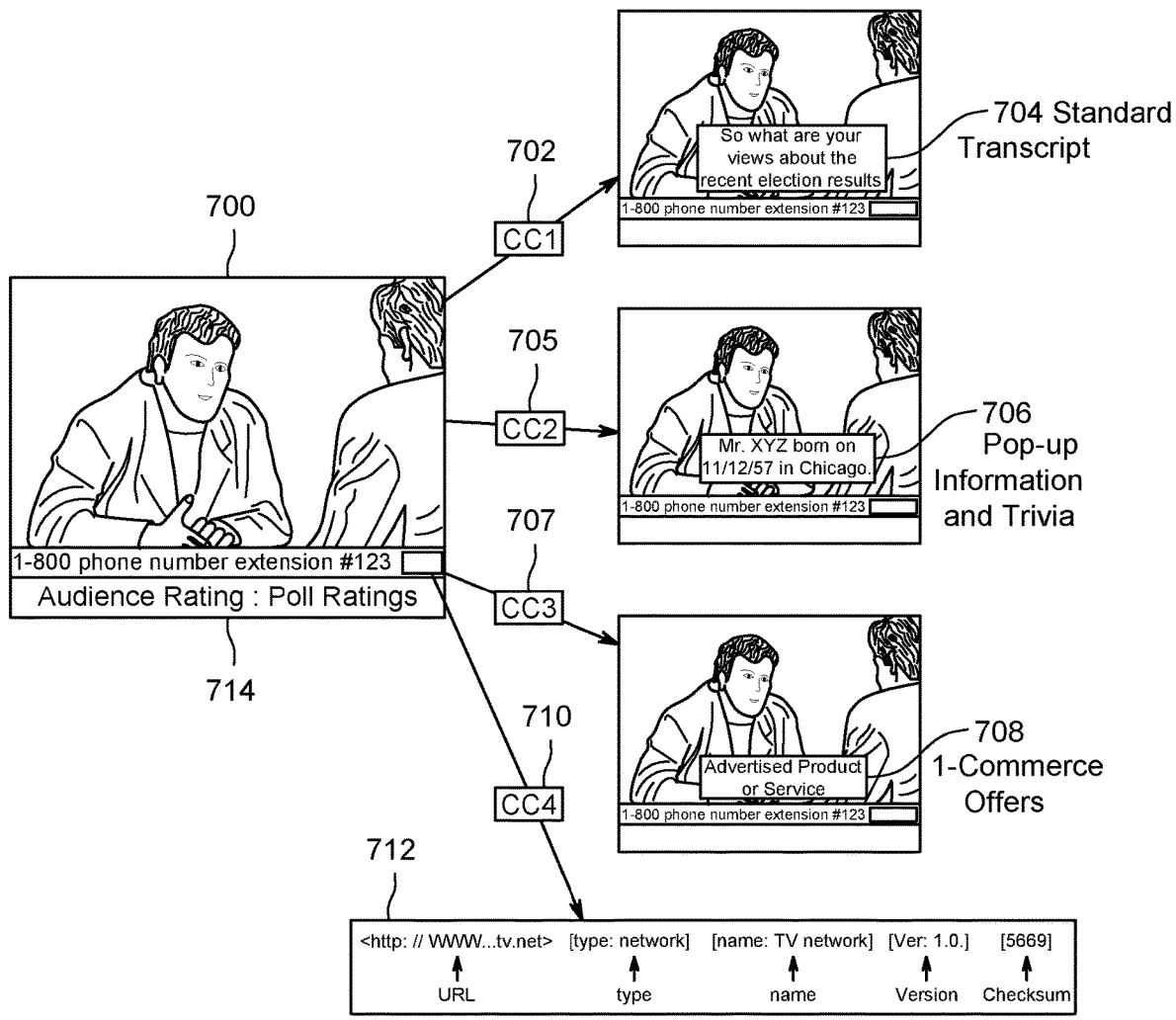
FIG. 16 is a block diagram of iVOD content including interactive features in accordance with an exemplary embodiment of the present invention.

FIG. 16 is a block diagram of iVOD content including interactive features in accordance with an exemplary embodiment of the present invention. iVOD content served by an interactive programming host can be accessed by a viewer over a communications network, a computer network, a satellite television network, or a cable television network. The use of a television signal provides the capability to embed the interactive programming components of the interactive programming in a vertical blanking interval of the television signal as well as captioning information as previously described. For example, as illustrated in table 1a above, captioning information may be included in the CC1, CC2, CC3, and CC4 field. In accordance with an exemplary embodiment of the present invention, an iVOD interactive program includes a content signal 700 and a plurality of interactive components embedded in the CC1, CC2, CC3, and CC4 fields. In this exemplary iVOD interactive program, the CC1 field 702 includes a standard transcript 704 while the CC2 field 705 includes additional information 706 about a subject of the interactive programming content signal, and the CC3 field 707 and the CC4 field 710 include commerce or "tcommerce" links 708 such or trigger 712 including URLs to eCommerce locations on the Internet. In this way, a producer can provide additional enhanced content to a viewer of previously produced interactive programming.

In addition to the interactive components embedded in the CC fields, the interactive program further includes a field or "ticker" 714 for display of information that is constantly updated based on participant responses to the iVOD content. This ticker can include information such as audience approval ratings for the iVOD program and participant polling responses.

Figure 17:
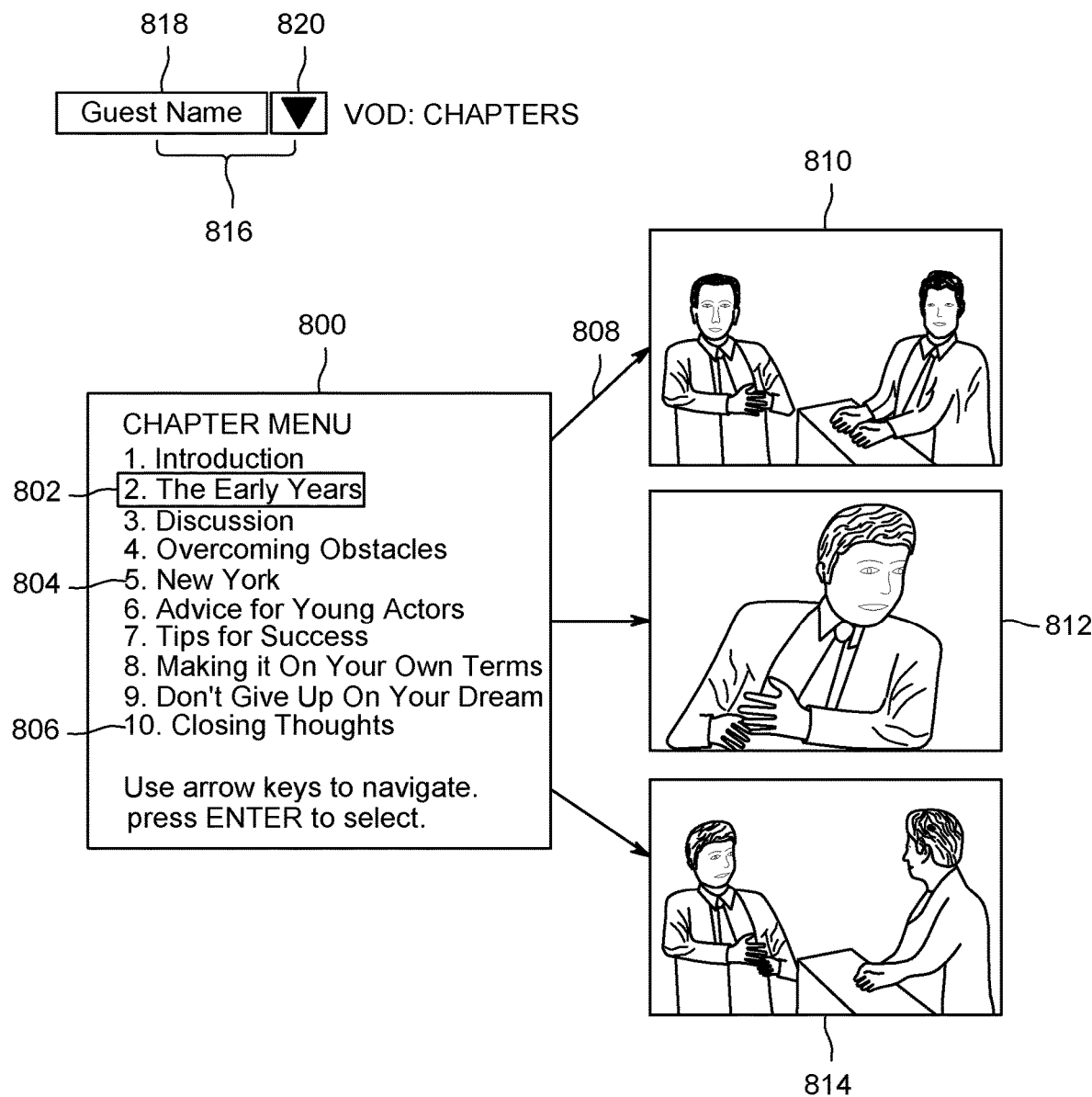
FIG. 17 is a block diagram of iVOD interactive programming including chapter features in accordance with an exemplary embodiment of the present invention.

FIG. 17 is a block diagram of iVOD interactive programming including chapter features in accordance with an exemplary embodiment of the present invention. A chapter feature 800 of the iVOD interactive programming is used by a participant to select portions of iVOD interactive programming served by an interactive programming server that a participant may wish to participate in. A chapter feature includes a chapter menu 800 that is presented to a participant. The chapter menu includes a plurality of selectable chapter icons, such as chapter icons 802, 804, and 806. A participant selects a chapter icon and the participant's selection 808 is transmitted back to the interactive programming server which then transmits a chapter portion 810 of the iVOD interactive programming back to the participant for viewing. In a like manner, chapter icon 804 corresponds to iVOD interactive programming chapter portion 812 and chapter icon 806 corresponds to iVOD interactive programming chapter portion 814.

In one embodiment of iVOD interactive programming, a participant uses a guest selector 816 to search for iVOD programming generated for a particular subject such as a talk show featuring a particular guest. The participant can access programming for a particular interview guest by selecting a pull down menu 820 listing the names of guests. Once selected, the guest name appears in a guest name field 818 and iVOD interactive programming is made available to the participant wherein the iVOD interactive programming features the guest. iVOD interactive programming may also be searched for having other features. For example, iVOD interactive programming may be proposed for a participant knowing that some participants searched for a particular guest also searched for another related guest. As another example, the iVOD interactive programming may be searched for specific events such as unexpected or notable statements by guests during a talk show. As another example, participants may select iVOD programming from a list of "top-ten" programming segments.

Figure 18:
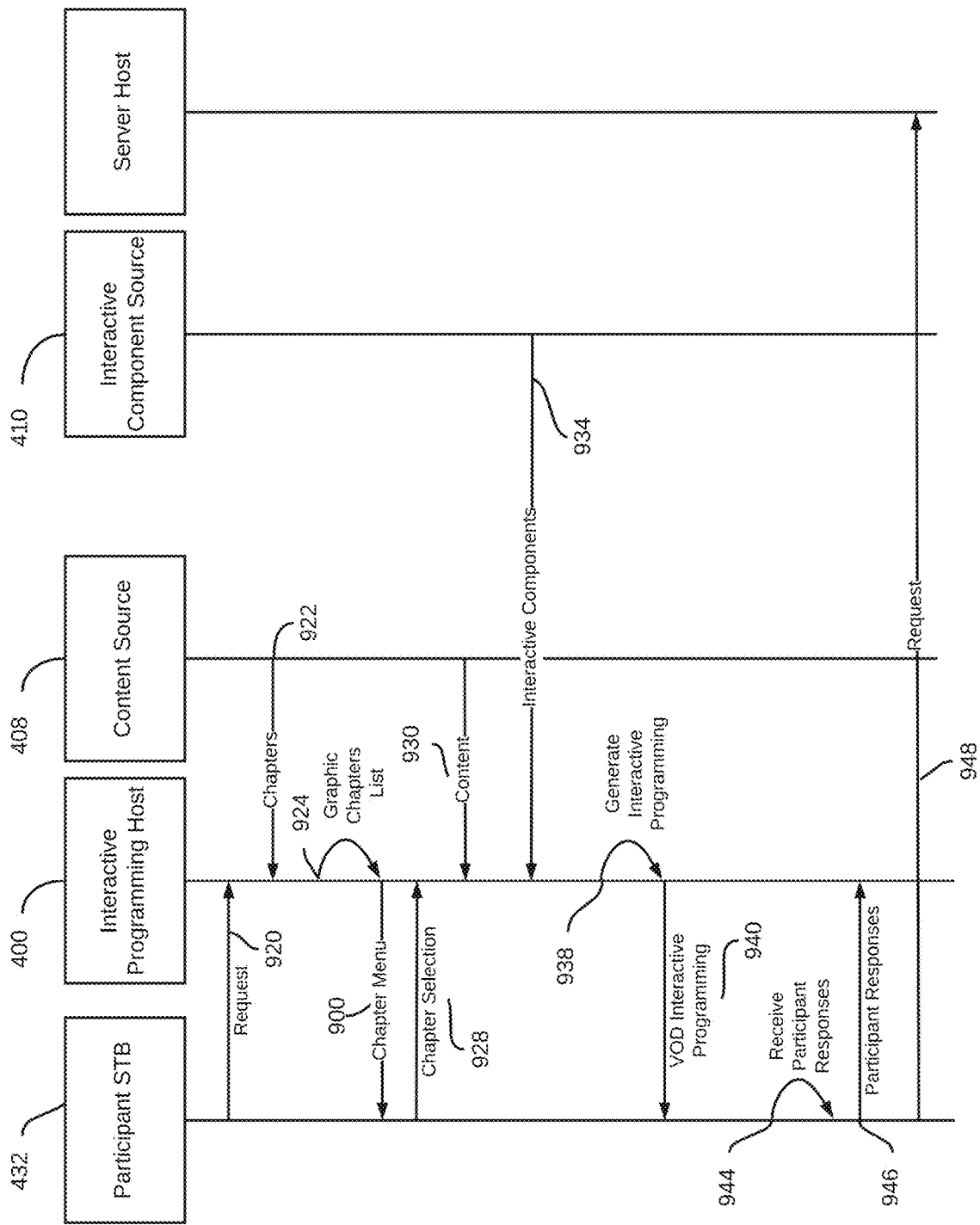
FIG. 18 is a sequence diagram of an iVOD interactive programming generation process in accordance with an exemplary embodiment of the present invention.

FIG. 18 is a sequence diagram of an iVOD interactive programming generation process in accordance with an exemplary embodiment of the present invention. A participant uses a participant STB 432 to access an interactive programming host 400 and transmits a request 920 for iVOD interactive programming. The interactive programming host accesses content from a content source 408 including chapter information and retrieves chapter information 922 for the requested iVOD interactive programming. The interactive programming host uses the chapter information to generate a chapter menu 900 having a list of selectable chapters as previously described. The user makes a chapter selection 928 from the chapter menu using the participant STB and transmits the chapter selection back to the interactive programming host. The interactive programming host uses the chapter selection to access and retrieve iVOD interactive programming content 930 and interactive components 934 from an interactive component source 410. The interactive programming server uses the content and interactive components to generate (938) an iVOD interactive programming signal 940 that is transmitted to the participant STB for viewing by the participant. The participant STB receives participant responses 944 to the content portion of the iVOD interactive programming and transmits the participant responses 946 to the interactive programming host. If a participant selects a link from a trigger to a commerce site, the participant STB transmits a request 948 to the commercial site as specified in the trigger.

The types of interactive components that may be included in iVOD interactive programming varies depending on the desires of a producer. In one iVOD interactive program in accordance with an exemplary embodiment of the present invention, a producer may include participant polls in a datafeed of the interactive components. Participants may answer the poll and the interactive programming host tabulates the participant's responses and includes them in the content portion of the interactive programming as a "ticker" that is constantly updated.

In another iVOD interactive program in accordance with an exemplary embodiment of the present invention, a producer may embed "Easter eggs" in the interactive components of an iVOD interactive program. A participant looks for the Easter eggs and once found, the Easter eggs unlock special features like audio messages from a producer or a chance to win a prize from a sponsor. In addition, participants may visit a Web site to get information on how to unlock special bonus material in exchange for registration information or viewing an advertisement.

In another iVOD interactive program in accordance with an exemplary embodiment of the present invention, a producer may include archival historical footage related to a specific iVOD interactive program.

In another iVOD interactive program in accordance with an exemplary embodiment of the present invention, a producer may include opposition running commentary. For example, an opposing view point may be presented during a politically oriented iVOD interactive program.

In another iVOD interactive program in accordance with an exemplary embodiment of the present invention, a producer may include on-camera pre-screening interviews of talk show guests.

In another iVOD interactive program in accordance with an exemplary embodiment of the present invention, a producer may include diagrams of a particular structure being discussed, such as diagrams of architecturally significant buildings during a presentation on architecture.

In another iVOD interactive program in accordance with an exemplary embodiment of the present invention, a producer may include behind-the scenes footage of the production of the iVOD interactive program.

In another iVOD interactive program in accordance with an exemplary embodiment of the present invention, a producer may include featurettes such as a documentary on a day in the life of a celebrity.

In another iVOD interactive program in accordance with an exemplary embodiment of the present invention, a producer may include triggers used for television Commerce (tCommerce) transactions.

In another iVOD interactive program in accordance with an exemplary embodiment of the present invention, a producer may include advertisements that a participant may view at their discretion. In addition, the advertisements may be linked to other information or tCommerce sites through the use of triggers.

In another iVOD interactive program in accordance with an exemplary embodiment of the present invention, a producer may include pop-up trivia facts including questions that a participant may answer. Answers from a plurality of participants may be collected as participant responses by the interactive programming server and scored so that a participant can see how the participant's performance in answering the questions compared to other participants.

Figure 19:
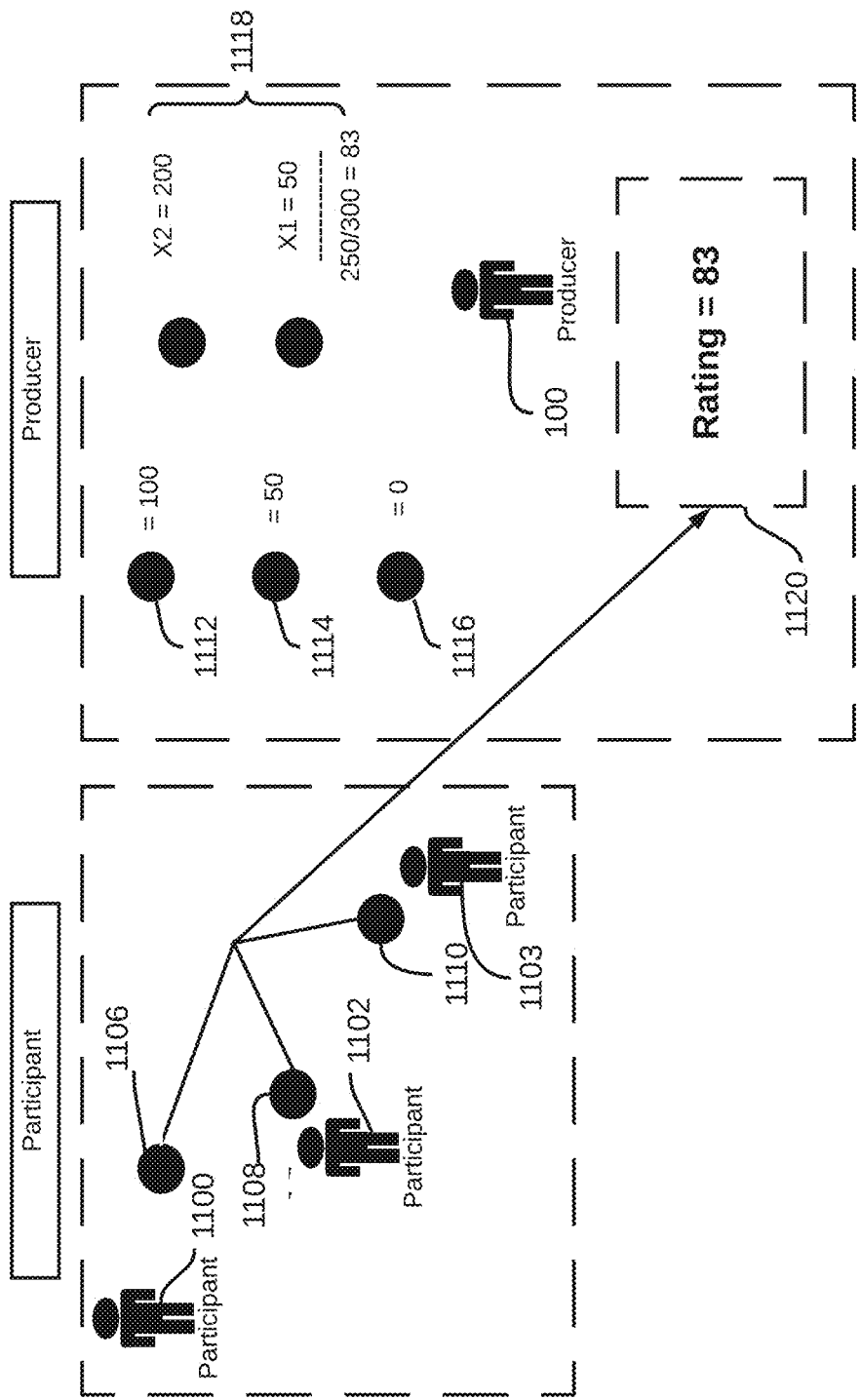
FIG. 19 is a diagram depicting a process for receiving participant reactions to an interactive program and calculating an audience approval system rating for an interactive program in accordance with an exemplary embodiment of the present invention.

FIG. 19 is a diagram depicting a process for receiving participant reactions to an interactive program and calculating an audience approval system rating for an interactive program in accordance with an exemplary embodiment of the present invention. A producer 100 generates an interactive program and transmits the interactive program to a plurality of participants as exemplified by participants 1100, 1102 and 1103. Each participant may have a different opinion of the quality of the interactive program; therefore, each participant is provided with an individual audience approval system button as exemplified by audience approval system buttons 1106, 1108, and 1110. Each participant selects an audience approval system rating button corresponding to the participant's subjective rating of the interactive program. The selection of an audience approval system button transmits a corresponding audience approval system signal to the interactive programming host (not shown) thus creating a plurality of audience approval system signals for evaluation by the interactive programming host. The interactive programming host receives the plurality of audience approval system signals and uses them to generate a single audience approval system rating signal and transmits the audience approval system rating signal for display with the interactive programming content.

In an audience approval system in accordance with an exemplary embodiment of the present invention, an audience approval system signal can take on three states, 1112, 1114, and 1116, with each state representing a participant's subjective opinion of the interactive program. In this embodiment, the three states are mapped to the corresponding numeric values of "100", "50", and "0", with "100" representing a participant's complete satisfaction with the interactive program, "50 " representing the participant's partial satisfaction with the interactive program, and "0" representing the participant's complete dissatisfaction with the interactive program. Each of the plurality of audience approval system signals are mapped to one of these numeric values. These numeric values are used to generate an arithmetic mean representing the audience approval system rating of the interactive program. In the illustrated example of FIG. 11, participant 1100 rates the interactive program at "100", participant 1102 rates the interactive program at "50", and participant 1104 rates the interactive program at "100". These values are used by the interactive programming host to generate (1118) an arithmetic mean 1120 of the plurality of mapped participants' audience approval system signals. The arithmetic mean is presented to the participants as the audience approval system rating of the producer's interactive program. In one audience approval system in accordance with an exemplary embodiment of the present invention, the audience approval system rating is mapped to a color, with the numeric value of "100" being represented in green, the numeric value of "50" being represented in yellow, and the numeric value of "0" being represented in red.

Figure 20:
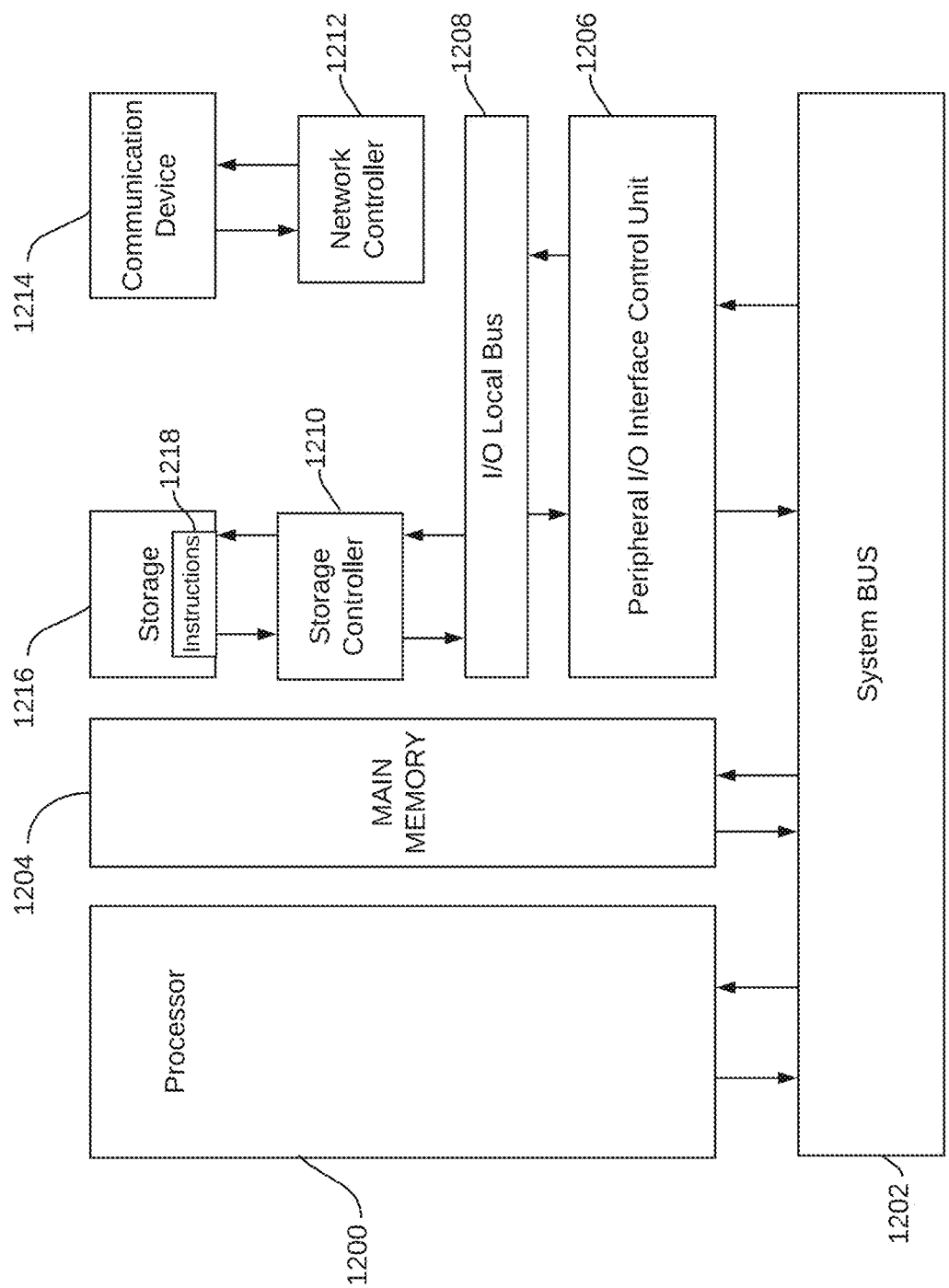
FIG. 20 is a hardware architecture diagram of a data processing system suitable for use as an interactive programming host in accordance with an exemplary embodiment of the present invention.

FIG. 20 is a hardware architecture diagram of a data processing system suitable for use as an interactive programming host in accordance with an exemplary embodiment of the present invention. A data processing system includes a processor 1200 operatively coupled via a system bus 1202 to a main memory 1204 and an I/O control unit 1206. The I/O interface control unit is operatively coupled via an I/O local bus 1208 to a storage controller 1210, and a network communications controller 1212. A communications device 1214 is operatively coupled to the network communications controller and is adapted to allow software objects hosted by the data processing system to communicate via a network with other software objects.

The storage controller is operatively coupled to a storage device 1216. Computer program instructions 1218 implementing an interactive programming server are stored on the disk storage device until the processor retrieves the computer program instructions and stores them in the main memory. The processor then executes the computer program instructions stored in the main memory to implement the interactive programming server.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents.

What is claimed is:

1. A method for simultaneously presenting a multimedia content to a plurality of participant client devices, each of the plurality of participant client devices including a display, the method comprising:
   providing a producer interface at a producer client device, the producer client device including a display and the producer interface including one or more interactive elements to enable a user of the producer client device to select the multimedia content;
   generating an interactive program, the interactive program including the multimedia content and an interactive component associated with the multimedia content;
   enabling users of the plurality of participant client devices and the user of the producer client device to interact with the interactive program to cause the multimedia content and the interactive component to be simultaneously displayed on the display of each of the participant client devices and the display of the producer client device;
   receiving, from a first one of the participant client devices, a response to the multimedia content, the response to the multimedia content being generated at the first one of the participant client devices based on an interaction of the user of the first one of the participant client devices with the interactive component while the multimedia content is being displayed on the first one of the participant client devices;
   transmitting the received response to the multimedia content generated at the first one of the participant client devices to each of the plurality of participant client devices and the producer client device;
   causing the response to the multimedia content generated at the first one of the participant devices to be displayed simultaneously with the multimedia content on the display of each of the participant client devices and the display of the producer client device;
   enabling the user of the producer client device to interact with the interactive program to add additional multimedia content to the interactive program; and
   providing the user of the producer client device and the users of the plurality of participant client devices access to the multimedia content and the response to the multimedia content generated at the first one of the participant client devices such that the user of the producer client device can view the multimedia content and the response to the multimedia content on the display of the producer client device and the users of the plurality of participant client devices can view the multimedia content and the response to the multimedia content on the displays of the participant client devices on demand after termination of the interactive program.

2. The method of claim 1, wherein the response to the multimedia content includes an audience reaction to the multimedia content.

3. The method of claim 1, wherein the response to the multimedia content includes an answer to a poll question.

4. The method of claim 1, wherein the interactive component associated with the multimedia content includes additional information about the multimedia content.

5. The method of claim 1, wherein the interactive component associated with the multimedia content is a uniform resource locator.

6. The method of claim 1, wherein the interactive component associated with the multimedia content includes an advertisement.

7. The method of claim 1, wherein the interactive component associated with the multimedia content includes an interactive advertisement.

8. A system for simultaneously presenting a multimedia content to a plurality of participant client devices, each of the plurality of participant client devices including a display, the system comprising:
   one or more servers, each of the one or more servers including a hardware processor, a hardware memory, and program instructions stored in the memory and executable by the processor to cause the one or more servers to:
   provide a producer interface at a producer client device, the producer client device including a display and the producer interface including one or more interactive elements to enable a user of the producer client device to select the multimedia content;
   generate an interactive program, the interactive program including the multimedia content and an interactive component associated with the multimedia content;
   enable users of the plurality of participant client devices and the user of the producer client device to interact with the interactive program to cause the multimedia content and the interactive component to be simultaneously displayed on the display of each of the participant client devices and the display of the producer client device;
   receive, from a first one of the participant client devices, a response to the multimedia content, the response to the multimedia content being generated at the first one of the participant client devices based on an interaction of the user of the first one of the participant client devices with the interactive component while the multimedia content is being displayed on the first one of the participant client devices;

transmit the received response to the multimedia content generated at the first one of the participant client devices to each of the plurality of participant client devices and the producer client device;

cause the response to the multimedia content generated at the first one of the participant devices to be displayed simultaneously with the multimedia content on the display of each of the participant client devices and the display of the producer client device;

enable the user of the producer client device to interact with the interactive program to add additional multimedia content to the interactive program; and provide the user of the producer client device and the users of the plurality of participant client devices access to the multimedia content and the response to the multimedia content generated at the first one of the participant client devices such that the user of the producer client device can view the multimedia content and the response to the multimedia content on the display of the producer client device and the users of the plurality of participant client devices can view the multimedia content and the response to the multimedia content on the displays of the participant client devices on demand after termination of the interactive program.

9. The system of claim 8, wherein the response to the multimedia content includes an audience reaction to the multimedia content.

10. The system of claim 8, wherein the response to the multimedia content includes an answer to a poll question.

11. The system of claim 8, wherein the interactive component associated with the multimedia content includes additional information about the multimedia content.

12. The system of claim 8, wherein the interactive component associated with the multimedia content is a uniform resource locator.

13. The system of claim 8, wherein the interactive component associated with the multimedia content includes an advertisement.

14. The system of claim 8, wherein the interactive component associated with the multimedia content includes an interactive advertisement.

* * * * *